US012090351B2

(12) United States Patent
Nowicki et al.

(10) Patent No.: US 12,090,351 B2
(45) Date of Patent: *Sep. 17, 2024

(54) FALL PROTECTION EQUIPMENT HAVING INDUCTIVE SENSOR FOR CONNECTION STATUS AND CONTROL

(71) Applicant: 3M INNOVATIVE PROPERTIES COMPANY, St. Paul, MN (US)

(72) Inventors: Anthony J. Nowicki, Woodbury, MN (US); Ronald D. Jesme, Plymouth, MN (US); Judd D. Perner, Missouri City, TX (US); Scott E. Brigham, Maplewood, MN (US); Jeffrey T. Keacher, Denver, CO (US); Mohsen Salehi, Woodbury, MN (US); Jonathan J. Lepp, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,651

(22) Filed: Mar. 15, 2023

(65) Prior Publication Data

US 2023/0218935 A1 Jul. 13, 2023

Related U.S. Application Data

(63) Continuation of application No. 16/968,281, filed as application No. PCT/US2019/016768 on Feb. 6, 2019, now Pat. No. 11,633,633.

(Continued)

(51) Int. Cl.
*G08B 21/00* (2006.01)
*A62B 35/00* (2006.01)
(Continued)

(52) U.S. Cl.
CPC ...... *A62B 35/0068* (2013.01); *A62B 35/0037* (2013.01); *A62B 35/0075* (2013.01);
(Continued)

(58) Field of Classification Search
CPC ............ A62B 35/0068; A62B 35/0037; A62B 35/0075; A62B 35/0093; A62B 35/04;
(Continued)

(56) References Cited

U.S. PATENT DOCUMENTS 10,092,784 B2 10/2018 Dehondt et al.
11,633,633 B2 * 4/2023 Nowicki ............... F16B 45/028
340/687

(Continued)

FOREIGN PATENT DOCUMENTS

CN 204411531 U 6/2015
CN 106237562 B 3/2019
(Continued)

OTHER PUBLICATIONS

International Search Report for PCT International Application No. PCT/US2019/016768, mailed on Apr. 26, 2019, 5 pages.

*Primary Examiner* — Anh V La
(74) *Attorney, Agent, or Firm* — Kenneth B. Wood

(57) ABSTRACT

Techniques are described for monitoring and controlling fall protection equipment. For example, the techniques of this disclosure may be used to monitor the connection status of fall protection equipment, e.g., whether or not the fall protection equipment is connected to a support structure. The techniques described in the disclosure may determine whether the fall protection equipment is connected to a support structure based on changes in a resonant frequency of an electronic circuit of an inductive sensor within the fall protection equipment. The inductive sensor may be formed from sets of one or more coils, where a first set of one or (Continued)

more coils and a second set of one or more coils are wound in opposite directions.

24 Claims, 15 Drawing Sheets

Related U.S. Application Data

(60) Provisional application No. 62/628,720, filed on Feb. 9, 2018.

(51) Int. Cl.
| | | |
|---|---|---|
| *F16B 45/02* | (2006.01) | |
| *G01V 3/10* | (2006.01) | |
| *G08B 21/02* | (2006.01) | |
| *A62B 35/04* | (2006.01) | |

(52) U.S. Cl.
CPC .......... *F16B 45/023* (2021.05); *F16B 45/024* (2021.05); *F16B 45/028* (2021.05); *G01V 3/101* (2013.01); *G08B 21/02* (2013.01); *A62B 35/0093* (2013.01); *A62B 35/04* (2013.01)

(58) Field of Classification Search
CPC .... F16B 45/023; F16B 45/024; F16B 45/028; F16B 45/02; G01V 3/101; G08B 21/02
USPC .................. 340/687, 686.1, 686.4, 657, 652
See application file for complete search history.

(56) References Cited

U.S. PATENT DOCUMENTS

| | | |
|---|---|---|
| 2003/0097737 A1 | 5/2003 | Gartsbeyn |
| 2003/0164697 A1 | 9/2003 | Hardie |
| 2006/0132120 A1 | 6/2006 | Luber et al. |
| 2010/0231402 A1 | 9/2010 | Flynt et al. |
| 2012/0067666 A1* | 3/2012 | Smith ................ A62B 35/04 182/3 |
| 2013/0187742 A1 | 7/2013 | Porter et al. |
| 2015/0096154 A1* | 4/2015 | Canfield ................ F16B 45/02 24/517 |
| 2015/0265860 A1* | 9/2015 | Kennedy ........... A62B 35/0075 182/3 |
| 2016/0107007 A1 | 4/2016 | Pollard |
| 2017/0087392 A1 | 3/2017 | Lambert et al. |
| 2017/0193799 A1 | 7/2017 | Holub |
| 2017/0291049 A1* | 10/2017 | Hetrich .............. A62B 35/0075 |
| 2019/0054328 A1* | 2/2019 | Bhaskarwar ....... A62B 35/0075 |

FOREIGN PATENT DOCUMENTS

| | | |
|---|---|---|
| JP | 2007044166 A | 2/2007 |
| JP | 2014004005 A | 1/2014 |
| JP | 2014018338 A | 2/2014 |
| JP | 2017051271 A | 3/2017 |
| KR | 20160135080 A | 11/2016 |
| KR | 20170031899 A | 3/2017 |
| WO | 2008049143 A1 | 5/2008 |
| WO | 2019080089 A1 | 5/2019 |

* cited by examiner

FALL PROTECTION EQUIPMENT HAVING INDUCTIVE SENSOR FOR CONNECTION STATUS AND CONTROL

TECHNICAL FIELD

This disclosure relates to safety equipment and, in particular, fall protection equipment.

BACKGROUND

Fall protection equipment is important safety equipment for workers operating at potentially harmful or even deadly heights. For example, to help ensure safety in the event of a fall, workers often wear safety harnesses connected to support structures with fall protection equipment such as lanyards, energy absorbers, self-retracting lanyards (SRLs), descenders, and the like. When a worker is connected to a support structure, the worker may be referred to as being "tied off" or "anchored." In order to maintain a safe working condition when working at height, a worker may maintain at least one connection to a support structure at all times.

Fall protection equipment may include a variety of components for connecting a worker to a support structure (also referred to as an anchorage). For example, snap hooks and carabiners may have moveable gates that allow a worker to connect to and disconnect from a support structure. As another example, a ladder safety sleeve may have a moveable gate that allows the worker to connect to and disconnect from a climbing ladder fall arrest system carrier e.g., flexible cable or rigid rail support structure.

SUMMARY

In general, this disclosure describes fall protective equipment having inductive sensors for monitoring and controlling usage of the fall protection equipment. For example, the disclosure describes examples of sensing techniques to confirm that a fall protection device is coupled to a support structure to ensure that a worker is properly tied off (e.g., anchored) to the structure. This disclosure describes using inductive sensing techniques, such as detecting changes to a resonant frequency of electronic circuits of one or more inductive sensors within the fall protection device, to determine whether a support structure is within an area of attachment of the fall protection device.

In one example, the disclosure describes a fall protection device comprising a body that at least partially defines an area of attachment for attaching the fall protection device to a support structure, a moveable gate connected to the body and configured to move between an open position and a closed position. The open position provides access to the area of attachment of the fall protection device and the closed position restricts access to the area of attachment. The fall protection device also includes an inductive sensor within the body for sensing whether the support structure is within the area of attachment. The inductive sensor includes an electrical circuit arranged within the body so that a resonant frequency of the electrical circuit of the inductive sensor changes when the support structure is within the area of attachment relative to when the support structure is not within the area of attachment.

In one example, the disclosure describes a system for fall protection detection, the system comprising a fall protection device comprising an inductive sensor having an electronic circuit, and one or more processors coupled to the inductive sensor. The one or more processors are configured to determine a change in a resonant frequency of the electronic circuit of the inductive sensor, determine whether a support structure is within an area of attachment of the fall protection device based on the change in the resonant frequency of the electronic circuit of the inductive sensor, and generate information indicating whether the fall protection device is anchored to the support structure at least based in part on the determination of whether the support structure is within the area of attachment of the fall protection device.

In one example, the disclosure describes a method for fall protection detection, the method comprising determining a change in a resonant frequency of an electronic circuit of an inductive sensor of a fall protection device, determining whether a support structure is within an area of attachment of the fall protection device based on the change in the resonant frequency of the electronic circuit of the inductive sensor, and generating information indicating whether the fall protection device is anchored to the support structure at least based in part on the determination of whether the support structure is within the area of attachment of the fall protection device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
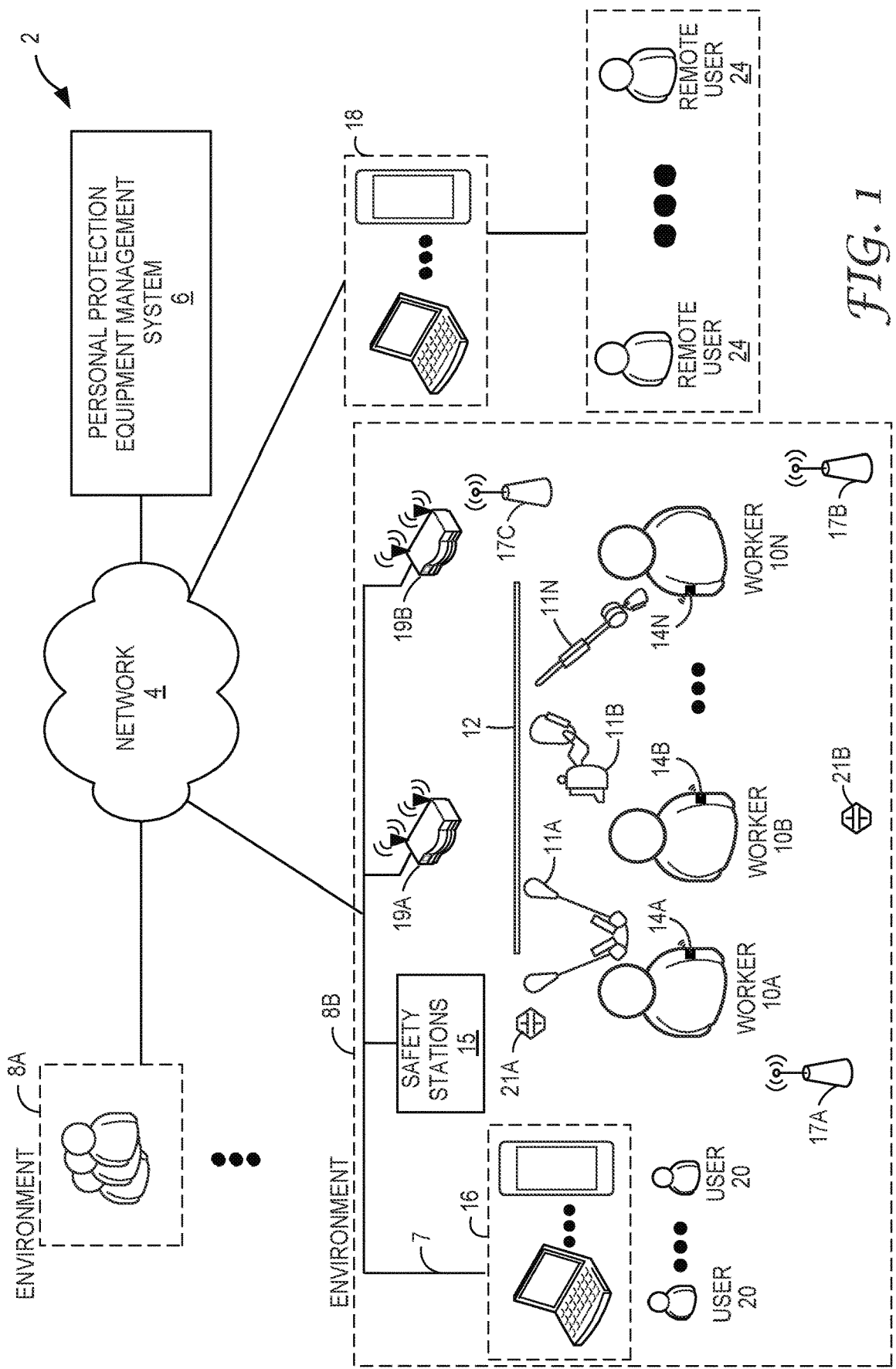
FIG. 1 is a block diagram illustrating an example system in which personal protection equipment (PPEs) having embedded sensors and communication capabilities are utilized within a number of work environments and are managed by a personal protection equipment management system in accordance with various techniques of this disclosure.

According to aspects of this disclosure, an article of fall protection device may be configured to incorporate one or more inductive sensors for sensing operation of the fall protection device. A fall protection device may generally refer to a device used to connect a user (e.g., a worker) to a support structure for the purpose of securing the user to the support structure in the event of a fall (e.g., tying off or anchoring the worker to the support structure). Examples of fall protection equipment include a variety of carabiners (also referred to as "spring hooks" or "snap hooks"), shackles, carrier sleeves, or other devices that are capable of connecting a user to and disconnecting a user from the support structure. A particular example of a snap hook that may be adapted to incorporate certain techniques of this disclosure is the Saflok™ Snap Hook manufactured by 3M Fall Protection Business. A particular example of a carrier sleeve may be adapted to incorporate certain techniques of this disclosure is the Lad-Saf™ X3 Detachable Carrier Sleeve manufactured by 3M Fall Protection Business. A support structure may include an anchor, a lifeline, or another structure capable of supporting the weight of a user in the event of a fall.

In some examples, the inductive sensors senses whether a support structure is disposed within an area of attachment for the fall protection equipment, or other operations or characteristics of the fall protection equipment. For example, the electrical characteristics of the inductive sensors may be indicative of whether the worker is anchored to support structure. As described herein, an area of attachment of fall protection equipment may generally refer to an area defined by one or more components of the fall protection equipment that encompass the support structure. That is, when secured to a support structure, the area of attachment is the area of the fall protection equipment in which the support structure is disposed. With respect to a carabiner as an example, the area of attachment may be the interior area of the carabiner defined by a body and a gate of the carabiner.

To be properly tied off, the fall protection device should be connected to a support structure, typically metal, when used by a worker. This disclosure describes examples of fall protection devices configured with inductive sensors that are used to determine whether a support structure is disposed within the fall protection equipment, and example algorithms to determine whether a metal support structure is present using the example inductive sensors.

According to aspects of this disclosure, the fall protection device and/or a computing device in communication with the fall protection device may use information to determine electrical characteristic changes, such as changes in resonant frequencies, in the inductive sensors arranged within the fall protection equipment to determine whether the fall protection equipment is anchored to a metal support structure. As described in more detail, in response to a metal being disposed within the area of attached of the fall protection equipment, the resonant frequency of one or more of the inductive sensors may shift.

For example, the electrical circuits of the inductive sensors resonate at a particular baseline resonant frequency when no metal is disposed in the area of attachment. In particular, the inductive sensor is configured with a plurality of electrical coils such that when current flows through the electrical circuits, the electrical circuits form an electromagnetic field within the area of attachment of the fall protection device. Accordingly, the inductive sensors may be positioned and oriented within the fall protection device so as to create the electromagnetic field in the area of attachment when current is driven through their respective electrical circuits.

As such, when metal is disposed in the area of attachment, the electromagnetic field may cause eddy currents in the metal or otherwise interact with the metal in a manner detectable by the inductive sensor of the fall protection device. For example, the eddy currents react with inductive sensor to form a set of coupled inductors. The coupling of the inductors in turn may change the measured resonant frequency of the electronic circuits within the fall protection device. However, if something other than metal or other conductive structure is disposed in the area of attachment, there may not be any interaction with the electromagnetic field, and hence no inductive coupling, and there may be no change in the measured resonant frequency of the electronic circuits of the inductive sensors, or at least not a change more than a threshold amount of frequency change. By detecting changes in the resonant frequency (e.g., more than the threshold amount of frequency change such as 5 kiloHertz (kHz)), the fall protection device and/or computing device in communication with the fall protection device may determine whether the support structure is anchored or not anchored.

Using inductive sensors for determining whether the fall protection device is anchored may provide technical advantages for various reasons. For example, conventional magnetic sensors may detect only ferrous metal, but use of inductive sensors as described herein may provide the technical advantage of being capable of detecting all or almost all metals and other conductive structures. The inductive sensors may be relatively low-power, low-cost, and durable for determining whether the structure is proper for tying off. For example, the inductive sensors may not be affected in ability to determine whether the structure is proper for tying off even if the fall protection equipment is covered (e.g., with concrete or ice). However, if mechanical sensors, rather than inductive sensors, are covered and used in fall protection devices, there may be an impact on proper sensing of whether the fall protection device is anchored. In some examples, the techniques described use a combination of mechanical sensors and inductive sensors to determine whether the fall protection device is anchored.

Furthermore, as described in more detail, in one or more examples, the inductive sensors may be used to detect the type of metal of the support structure. Detecting the type of metal may be useful in various scenarios. For example, a safety requirement may be that the fall protection device is to anchor to steel, and not anchor to aluminum. By determining the type of metal of the support structure, the example techniques may confirm whether fall protection device is anchored to the correct types of metals.

In some environments, external, distant magnetic fields (e.g., not those caused from current flowing through the electronic circuit) may impact the resonant frequency of the inductive sensor, such as by affecting the inductance of the inductive sensor. These external magnetic fields may cause errors in determining whether the resonant frequency changed for the one or more inductive sensors. In one or more examples, the inductive sensors include an inductor formed by two or more sets of coils (e.g., a first set of one or more coils, and a second set of one or more coils) wound in opposite directions relative to each other. The opposite windings of the coils cause any electric current generated in one of the coils due to the presence of external magnetic fields to substantially cancel any electric current generated in the other one of the coils due to the same external magnetic field. Because any electric currents caused by the external magnetic field(s) are generally cancelled out, the one or more inductive sensors may be immune or otherwise reduce the effects of the external magnetic field, thereby improving the detection of support structures and confirmation of proper anchoring of the device.

FIG. 1 is a block diagram illustrating an example computing system 2 that includes a personal protection equipment management system (PPEMS) 6 for managing personal protection equipment. As described herein, PPEMS allows authorized users to perform preventive occupational health and safety actions and manage inspections and maintenance of safety protective equipment. By interacting with PPEMS 6, safety professionals can, for example, manage area inspections, worker inspections, worker health and safety compliance training.

In general, PPEMS 6 provides data acquisition, monitoring, activity logging, reporting, predictive analytics and alert generation. For example, PPEMS 6 includes an underlying analytics and safety event prediction engine and alerting system in accordance with various examples described herein. As further described below, PPEMS 6 provides an integrated suite of personal safety protection equipment management tools and implements various techniques of this disclosure. That is, PPEMS 6 provides an integrated, end-to-end system for managing personal protection equipment, e.g., safety equipment, used by workers 8 within one or more physical environments 10, which may be construction sites, mining or manufacturing sites or any physical environment. The techniques of this disclosure may be realized within various parts of computing environment 2.

As shown in the example of FIG. 1, system 2 represents a computing environment in which a computing device within of a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protection equipment while engaging in tasks or activities within the respective environment.

In this example, environment 8A is shown as generally as having workers 10, while environment 8B is shown in expanded form to provide a more detailed example. In the example of FIG. 1, a plurality of workers 10A-10N are shown as utilizing respective fall protection devices 11A-11N (collectively, fall protection devices 11), which are shown in this example as a variety of carabiners, carrier sleeves, and self-retracting lanyards (SRLs), attached to safety support structure 12.

As further described herein, each of fall protection devices 11 includes embedded inductive sensors or monitoring devices and processing electronics configured to capture data in real-time as a user (e.g., worker) engages in activities while wearing the fall protection equipment. For example, as described in greater detail with respect to the example shown in FIG. 10, fall protection device 11 may include a variety of electronic sensors such as one or more sensors configured to sense a characteristic associated with a connection (referred to as connection sensors) and one or more usage and environment sensors for measuring operations of fall protection device 11. In addition, each of fall protection devices 11 may include one or more output devices for outputting data that is indicative of operation of fall protection device 11 and/or generating and outputting communications to the respective worker 10. For example, fall protection devices 11 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback). However, such feedback is not necessary in all examples.

In general, each of environments 8 include computing facilities (e.g., a local area network) by which fall protection devices 11 are able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. In addition, environment 8B includes a plurality of wireless access points 19A, 19B that may be geographically distributed throughout the environment to provide support for wireless communications throughout the work environment.

Each of fall protection devices 11 is configured to communicate data, such as sensed motions, events and conditions, via wireless communications, such as via 802.11 WiFi protocols, Bluetooth protocol or the like. Fall protection devices 11 may, for example, communicate directly with a wireless access point 19. As another example, each worker 10 may be equipped with a respective one of wearable communication hubs 14A-14M that enable and facilitate communication between fall protection devices 11 and PPEMS 6. For examples, fall protection devices 11 as well as other PPEs for the respective worker 10 may communicate with a respective communication hub 14 via Bluetooth or other short range protocol, and the communication hubs may communicate with PPEMs 6 via wireless communications processed by wireless access points 19. Although shown as wearable devices, hubs 14 may be implemented as stand-alone devices deployed within environment 8B.

In some instances, each of hubs 14 may operate as a wireless device for fall protection devices 11 relaying communications to and from fall protection devices 11, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from fall protection devices 11 and/or other PPEs within the respective environment, and provides a local computing environment for localized alerting based on streams of events in the event communication with PPEMS 6 is lost.

As shown in the example of FIG. 1, an environment, such as environment 8B, may also be one or more wireless-enabled beacons, such as beacons 17A-17C, that provide accurate location information within the work environment. For example, beacons 17A-17C may be GPS-enabled such that a controller within the respective beacon may be able to precisely determine the position of the respective beacon.

Based on wireless communications with one or more of beacons 17, a given article of fall protection devices 11 or communication hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also be one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6.

As such, PPEMS 6 may be configured to correlate the sensed environmental conditions with the particular regions and, therefore, may utilize the captured environmental data when processing event data received from fall protection devices 11. For example, PPEMS 6 may utilize the environmental data to aid generating alerts or other instructions for fall protection devices 11 and for performing predictive analytics, such as determining any correlations between certain environmental conditions (e.g., wind speed, heat, humidity, visibility) with abnormal worker behavior or increased safety events. As such, PPEMS 6 may utilize current environmental conditions to aid prediction and avoidance of imminent safety events. Example environmental conditions that may be sensed by sensing devices 21 include but are not limited to temperature, humidity, presence of gas, pressure, visibility, wind speed and the like.

In example implementations, an environment, such as environment 8B, may also include one or more safety stations 15 distributed throughout the environment to provide viewing stations for accessing PPEMs 6. Safety stations 15 may allow one of workers 10 to check out one of fall protection devices 11 and/or other safety equipment, verify that safety equipment is appropriate for a particular one of environments 8, and/or exchange data. For example, safety stations 15 may transmit alert rules, software updates, or firmware updates to fall protection devices 11 or other equipment. Safety stations 15 may also receive data cached on fall protection devices 11, hubs 14, and/or other safety equipment. That is, while fall protection devices 11 (and/or data hubs 14) may typically transmit usage data from sensors of fall protection devices 11 to network 4, in some instances, fall protection devices 11 (and/or data hubs 14) may not have connectivity to network 4. In such instances, fall protection devices 11 (and/or data hubs 14) may store usage data locally and transmit the usage data to safety stations 15 upon being in proximity with safety stations 15. Safety stations 15 may then upload the data from fall protection devices 11 and connect to network 4.

In addition, each of environments 8 include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, or the like), data collected during particular events, such as detected falls, sensed data acquired from the user, environment data, and the like. In addition, users 20, 24 may interact with PPEMS 6 to perform asset tracking and to schedule maintenance events for individual pieces of safety equipment, e.g., fall protection equipment 11, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, in some examples, PPEMS 6 integrates an event processing platform configured to process thousand or even millions of concurrent streams of events from digitally enabled PPEs, such as fall protection devices 11. An underlying analytics engine of PPEMS 6 may apply historical data and models to the inbound streams to compute assertions, such as identified anomalies or predicted occurrences of safety events based on conditions or behavior patterns of workers 10. PPEMS 6 may provide real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 integrates comprehensive tools for managing personal protection equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 24, 26, or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 2 for which unusually anomalous (e.g., high) safety events have been or are predicted to occur, identifications of any of environments 2 exhibiting anomalous occurrences of safety events relative to other environments, and the like.

PPEMS 6 may simplify workflows for individuals charged with monitoring and ensure safety compliance for an entity or environment. That is, the techniques of this disclosure may enable active safety management and allow an organization to take preventative or correction actions with respect to certain regions within environments 8, particular articles of fall protection devices 11 or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of fall protection devices 11. In this manner, PPEMS 6 may identify individual articles of fall protection devices 11 or workers 10 for which the metrics do not meet the benchmarks and prompt the users to intervene and/or perform procedures to improve the metrics relative to the benchmarks, thereby ensuring compliance and actively managing safety for workers 10.

One condition that PPEMS 6, hubs 14, safety stations 15, and/or computing device 16 track is whether workers 10 are properly tied off with respective fall protection devices 11 (e.g., track whether fall protection devices 11 are anchored). For example, fall protection device 11A is anchored when support structure 12 is a metal support structure, is within an area of attachment of fall protection device 11A, and a gate of fall protection device 11A is closed, thereby securing fall protection device 11A to the metal support structure. As described herein, this disclosure describes example techniques to determine whether fall protection devices are properly anchored based on measurements from sensors within respective fall protection devices 11.

As described herein, one or more of fall protection devices 11 include one or more inductive sensors that include respective electronic circuits having a resonant frequency based on the inductance and capacitance of the inductive sensors. Resonant frequency, in general, describes the frequency at which a response amplitude of the electrical circuit of the inducive sensors is at a relative maximum. In other words, when a signal having an input amplitude and the resonant frequency is applied to the inductive sensor, the ratio between the output amplitude and the input amplitude is maximized. As described, fall protection devices 11, or other computing devices, may utilize detection algorithms that detect changes in the resonant frequency of the electrical circuits of the inductive sensors if a metal structure, such as support structure 12, is proximate to the inductive sensor.

When current is driven through the electrical circuits of the inducive sensors, the inductive sensors generate an electromagnetic field within the area of attachment (e.g., the inductive sensors are positioned and oriented in a way to generate the electromagnetic field within the area of attachment). The electromagnetic field may cause eddy currents to generate within the metal structure, which in turn cause support structure 12 to inductively couple with the inductive sensor. The inductive coupling causes an effective change in the overall inductance (e.g., inductance from the inductive sensor and the coupling with the metal), which in turn shifts the resonant frequency (e.g., the measured resonant frequency).

In this disclosure, the term "baseline resonant frequency" refers to the resonant frequency of the electronic circuit of the inductive sensor when there is no metal structure in proximity to the inductive sensor. In one or more examples, PPEMS 6, hubs 14, safety stations 15, and/or computing device 16 determine whether fall protection devices 11 are anchored to a proper support structure, like support structure 12, based on changes to the baseline resonant frequency of the one or more inductive sensors of fall protection devices 11.

In some examples, temperature or normal prolonged use potentially changes the baseline resonant frequency of the inductive sensors even when no metal structure is proximate to the inductive sensors. This change in the baseline resonant frequency may otherwise cause false or incorrect detection of anchoring. This disclosure describes example techniques to recalibrate for changes in the baseline resonant frequency to ensure proper determination of anchoring. Moreover, in some work environments, external or stray magnetic fields may couple into the inductive sensor and cause changes in the baseline resonant frequency. This disclosure describes examples of inductive sensors that cancel out or otherwise squelch the effects of the external magnetic fields on the baseline resonant frequency, thereby improving detection.

Figure 2:
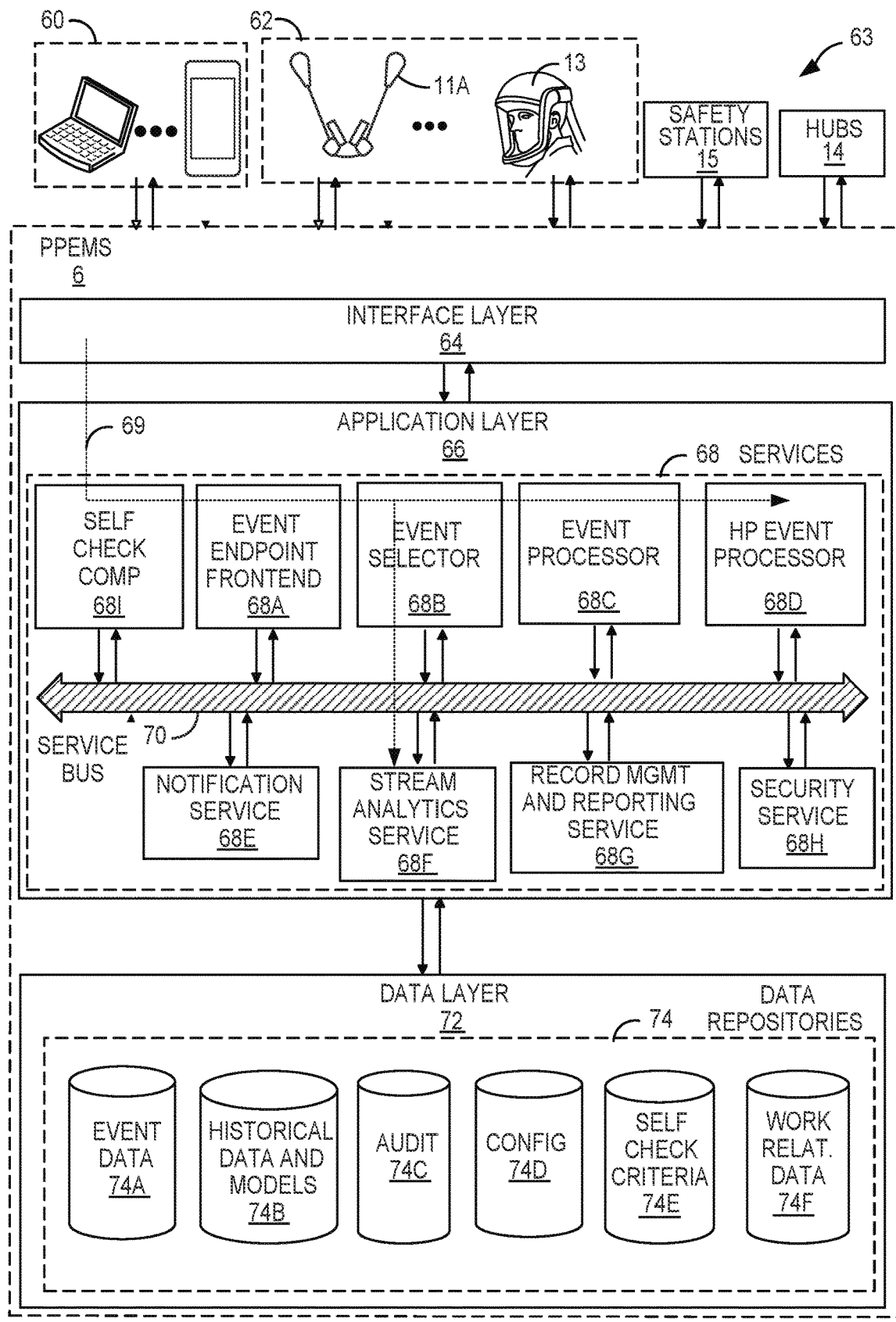
FIG. 2 is a block diagram illustrating an operating perspective of the personal protection equipment management system shown in FIG. 1.

FIG. 2 is a block diagram providing an operating perspective of PPEMS 6 when hosted as cloud-based platform capable of supporting multiple, distinct work environments 8 having an overall population of workers 10 that have a variety of communication enabled personal protection equipment (PPE), such as fall protection devices 11, respirators 13, safety helmets or other safety equipment. In the example of FIG. 2, the components of PPEMS 6 are arranged according to multiple logical layers that implement the techniques of the disclosure. Each layer may be implemented by one or more modules comprised of hardware, software, or a combination of hardware and software.

In FIG. 2, personal protection equipment (PPEs) 62, such as fall protection devices 11, respirators 13 and/or other equipment, either directly or by way of hubs 14, as well as computing devices 60, operate as clients 63 that communicate with PPEMS 6 via interface layer 64. Computing devices 60 typically execute client software applications, such as desktop applications, mobile application, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

As further described in this disclosure, PPEs 62 communicate with PPEMS 6 (directly or via hubs 14) to provide streams of data acquired from embedded sensors and other monitoring circuitry and receive from PPEMS 6 alerts, configuration and other communications. Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications 61 may request and display aggregate safety event information that summarizes or otherwise aggregates numerous individual instances of safety events and corresponding data acquired from PPEs 62 and or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6.

In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service.

When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. In still other examples, a pipeline system architecture could be used to enforce a workflow and logical processing of data messages as they are process by the software system services. Before describing the functionality of each of services 68, the layers are briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68H ("services 68") is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

In some examples, services 68 may include an event processing platform including an event endpoint frontend 68A, event selector 68B, event processor 68C and high priority (HP) event processor 68D. Event endpoint frontend 68A operates as a front-end interface for receiving and sending communications to PPEs 62 and hubs 14. In other words, event endpoint frontend 68A operates to as a front-line interface to safety equipment deployed within environments 8 and utilized by workers 10.

In some instances, event endpoint frontend 68A may be implemented as a plurality of tasks or jobs spawned to receive individual inbound communications of event streams 69 from the PPEs 62 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs may be real-time or pseudo real-time depending on communication delays and continuity.

Event selector 68B operates on the stream of events 69 received from PPEs 62 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure fall protection equipment 11 and the like. Responsive to processing high priority events, HP event processor 68D may immediately invoke notification service 68E to generate alerts, instructions, warnings or other similar messages to be output to fall protection devices 11, hubs 14 and/or remote users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data obtained from PPEs 62. For example, in some instances, event data 74A may include entire streams of samples of data obtained from electronic sensors of PPEs 62. In other instances, event data 74A may include a subset of such data, e.g., associated with a particular time period or activity of PPEs 62.

Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which represents an example of an analytics engine configured to perform in depth processing of the incoming stream of events to perform real-time analytics. Stream analytics service 68F may, for example, be configured to process and compare multiple streams of event data 74A with historical data and models 74B in real-time as event data 74A is received. In this way, stream analytic service 68D may be configured to detect anomalies, transform incoming event data values, trigger alerts upon detecting safety concerns based on conditions or worker behaviors.

Historical data and models 74B may include, for example, specified safety rules, business rules and the like. In this way, historical data and models 74B may characterize activity of a user of fall protection devices 11, e.g., as conforming to the safety rules, business rules, and the like. In addition, stream analytic service 68D may generate output for communicating to PPEs 62 by notification service 68F or computing devices 60 by way of record management and reporting service 68G.

Analytics service 68F may process inbound streams of events, potentially hundreds or thousands of streams of events, from enabled safety PPEs 62 utilized by workers 10 within environments 8 to apply historical data and models 74B to compute assertions, such as identified anomalies or predicted occurrences of imminent safety events based on conditions or behavior patterns of the workers. Analytics service 68D may publish the assertions to notification service 68F and/or record management by service bus 70 for output to any of clients 63.

In this way, analytics service 68F may configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine, for a particular worker, the likelihood that a safety event is imminent for the worker based on detected behavior or activity patterns, environmental conditions and geographic locations.

In some examples, analytics service 68F may generate user interfaces based on processing information stored by PPEMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events.

Analytics service 68F may, in some example, generate separate models for a particular worker, a particular population of workers, a particular environment, or combinations thereof. Analytics service 68F may update the models based on usage data received from PPEs 62. For example, analytics service 68F may update the models for a particular worker, a particular population of workers, a particular environment, or combinations thereof based on data received from PPEs 62.

Alternatively, or in addition, analytics service 68F may communicate all or portions of the generated code and/or the machine learning models to hubs 14 (or PPEs 62) for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups/types of PPEs 62. In response, record management and reporting service 68G accesses event information based on the request. Upon retrieving the event data, record management and reporting service 68G constructs an output response to the client application that initially requested the information.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In example implementations, services 68 may also include security service 68H that authenticate and authorize users and requests with PPEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Security service 68H may provide audit and logging functionality for operations performed at PPEMS 6. For instance, security service 68H may log operations performed by services 68 and/or data accessed by services 68 in data layer 72. Security service 68H may store audit information such as logged operations, accessed data, and rule processing results in audit data 74C. In some examples, security service 68H may generate events in response to one or more rules being satisfied. Security service 68H may store data indicating the events in audit data 74C.

PPEMS 6 may include self-check component 68I, self-check criteria 74E and work relation data 74F. Self-check criteria 74E may include one or more self-check criterion. Work relation data 74F may include mappings between data that corresponds to PPE, workers, and work environments. Work relation data 74F may be any suitable datastore for storing, retrieving, updating and deleting data. Work relation data store 74F may store a mapping between the unique identifier of worker 10A and a unique device identifier of data hub 14A. Work relation data store 74F may also map a worker to an environment. In the example of FIG. 2, self-check component 68I may receive or otherwise determine data from work relation data 74F for data hub 14A, worker 10A, and/or PPE associated with or assigned to worker 10A. Based on this data, self-check component 68I may select one or more self-check criteria from self-check criteria 74E. Self-check component 68I may send the self-check criteria to data hub 14A.

In some examples, event processor 68C and record management and reporting service 68G may generate information indicative of whether fall protection devices 11 are properly anchored. For example, fall protection devices 11 may be configured to transmit information that is ultimately received by PPEMS 6 that indicates whether fall protection devices 11 are anchored based on whether a resonant frequency of inductive sensors of fall protection devices 11 changed. Event processor 68C may process the data indicating whether fall protection devices 11 are anchored, and reporting services 68G generate reports indicating whether fall protection devices 11 are anchored. For instance, reporting services 68G may generate reports indicating how long, how often, when, etc. each one of fall protection devices 11 were anchored, where such information is generated based on sensing by inductive sensors of fall protection devices 11 including information of whether a resonant frequency of electronic circuits of the inductive sensors changed. In some examples, event processor 68B and notification service 68E may together generate alerts if workers 10 are not compliant with proper anchoring of fall protection devices 11.

Figure 3:
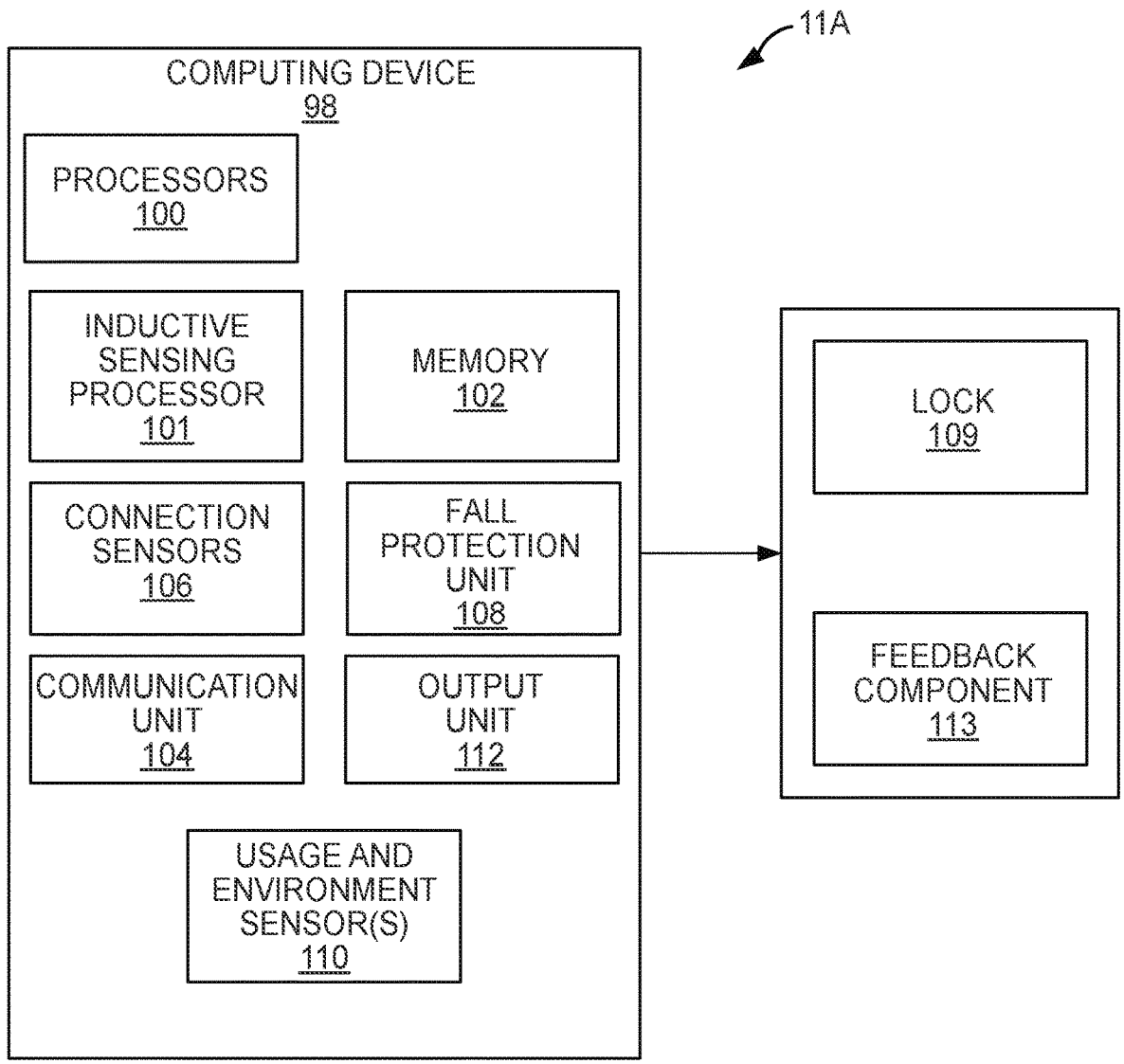
FIG. 3 is a block diagram illustrating one example of a computing device that may be used to monitor and/or control fall protection equipment in accordance with aspects of this disclosure.

FIG. 3 illustrates an example of a computing device that may be incorporated in an article of fall protection devices 11. For ease, the example is illustrated with respect to fall protection device 11A. Fall protection devices 11B-11N may be substantially similar, including identical, to fall protection device 11A.

In the illustrated example, computing device 98 includes processors 100, inductive sensing processor 101, memory 102, communication unit 104, one or more connection sensors 106, fall protection unit 108, one or more usage and environment sensors 110, and output unit 112. It should be understood that the architecture and arrangement of computing device 98 illustrated in FIG. 3 is shown for exemplary purposes only. In other examples, computing device 98 incorporated in an article of fall protection device 11A may be configured in a variety of other ways having additional, fewer, or alternative components than those shown in FIG. 3. For example, as described in greater detail below, computing device 98 may be configured to include only a subset of components, such as communication unit 104 and connection sensors 106 and may offload certain processing functions to anther device, such as one of hubs 14.

As one example, computing device 98 includes inductive sensing processor 101 that determines a resonant frequency of inductive sensors of sensors 106. In some examples, processors 100 further process information indicative of the resonant frequency. In some examples, communication unit 104 outputs information indicative of the resonant frequency for processing by other processors such as those of hubs 14 or PPEMS 6, as two non-limiting examples. For ease, the examples are described with respect to processors 100, but should be understood that the operations of processors 100 may be performed by other processors such as those of hubs 14 or PPEMS 6, or by a combination of processors 100 and other processors.

In general, computing device 98 include a plurality of sensors that capture real-time data regarding operation of fall protection device 11A and/or an environment in which fall protection device 11A is used. Such data is referred to herein as usage data. Processors 100, in one example, are configured to implement functionality and/or process instructions for execution within computing device 98. For example, processors 100 may be capable of processing instructions stored by memory 102. Processors 100 may include, for example, microprocessors, digital signal processors (DSPs), application specific integrated circuits (ASICs), field-programmable gate array (FPGAs), or equivalent discrete or integrated logic circuitry. Furthermore, in some examples processors 100 may be analog components such as adders, comparators, low-pass filters, and like. In this disclosure, the operations of processors 100 may be performed by DSPs, ASICs, FPGA, or by fixed-function analog circuitry like filters, comparators, and adders.

Memory 102 may include a computer-readable storage medium or computer-readable storage device. In some examples, memory 102 may include one or more of a short-term memory or a long-term memory. Memory 102 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 102 may store an operating system (not shown) or other application that controls the operation of components of computing device 98. For example, the operating system may facilitate the communication of data from electronic sensors (e.g., connection sensors 106) to communication unit 104. In some examples, memory 102 is used to store program instructions for execution by processors 100. Memory 102 may also be configured to store information within computing device 98 during operation.

Computing device 98 may use communication unit 104 to communicate with external devices via one or more wired or wireless connections. Communication unit 104 may include various mixers, filters, amplifiers and other components designed for signal modulation, as well as one or more antennas and/or other components designed for transmitting and receiving data. Communication unit 104 may send and receive data to other computing devices using any one or more suitable data communication techniques. Examples of such communication techniques include TCP/IP, Ethernet, Wi-Fi, Bluetooth, 4G, LTE, to name only a few examples. In some instances, communication unit 104 operates in accordance with the Bluetooth Low Energy (BLU) protocol.

Connection sensors 106 include a wide variety of sensors incorporated in fall protection device 11A and configured to generate output data indicative of an operation of fall protection device 11A or a characteristic of fall protection device 11A. For example, the connection sensors 106 may capture data that is indicative of a relative position of a component of fall protection device 11A or sense electrical characteristics (e.g., resonant frequency) indicative of whether a support structure is within an area of attachment for fall protection device 11A. Example connection sensors 106 include one or more switches, hall effect sensors, magnetic sensors, optical sensors, ultrasonic sensors, photoelectric sensors, rotary encoders, accelerometers, or the like. Particular examples of connection sensors 106 are described with respect to the examples of FIGS. 7-9 below.

As described in more detail, connection sensors 106 include one or more inductive sensors used to determine whether fall protection device 11A properly anchored to support structure 12. To be properly anchored, some business or safety requirements may dictate that fall protection device 11A should be anchored to a metal structure (e.g., support structure 12 should be metal structure). In one or more examples, the electrical characteristics of the one or more inductive sensors may indicate whether a metal support structure 12 is within fall protection device 11A.

The inductive sensors are tuned for a certain resonant frequency, referred to as baseline resonant frequency. The baseline resonant frequency is the resonant frequency of an inductive sensor when the inductive sensor is not inductively coupled with metal structure external to the fall protection device 11A. When the inductive sensors are proximate to metal, such as when metal is disposed within the area of attachment of fall protection device 11A, the resonant frequency of the inductive sensors may change. Processors 100, in some examples, are configured to determine whether there is a change in the resonant frequency of one or more inductive sensors of connection sensors 106 from the baseline resonant frequency. Based on whether there is a change in the resonant frequency, processors 100 or some other processor determines whether fall protection device 11A is anchored to support structure 12.

As illustrated, computing device 98 includes inductive sensing processor 101. Inductive sensing processor 101 may be part of processors 100, but is illustrated separately to ease with understanding. Inductive sensing processor 101 determines respective resonant frequencies of the inductive sensors of connection sensors 106. One example of inductive sensing processor 101 is the LDC1612/14 Multi-Channel 28-Bit Inductance to Digital Converter (LDC) for Inductive Sensing chip from Texas Instruments®. The output of inductive sensing processor 101 may be a digital signal indicating the resonant frequency of the inductive sensor(s) coupled to inductive sensing processor 101. Processors 100 receive the digital signal indicating the resonant frequency, and determine whether a support structure is within the area of attachment of fall protection device 11A based on whether there is a change in the resonant frequency.

In some examples, memory 102 stores baseline resonant frequency values of the inductive sensors of connection sensors 106. As described in more detail, the baseline resonant frequency values may change due to temperature and aging of the inductive sensors, and therefore, processors 100 may update the baseline resonant frequency values and store new baseline resonant frequency values in memory 102. For each inductive sensor, processors 100 determine difference values, where each difference value is indicative of a difference between the measured resonant frequency, measured by inductive sensing processor 101, and its current baseline resonant frequency value.

Processors 100 utilize the difference values for each of the inductive sensors to determine whether there is sufficient change in the resonant frequency to determine that metal is within the area of attachment of fall protection device 11A. As one example, if any of the difference values are greater than a frequency change threshold value, then processors 100 may determine that metal is disposed in the area of attachment of fall protection device 11A. However, due to the locations of the inductive sensors and the location of metal within the area of attachment, there is a possibility that metal is within the area of attachment but none of the difference values are greater than the frequency change threshold value. To address such a possibility, in some examples, processors 100 sum one or more of the difference values, and compare the summed difference value to the frequency change threshold value. Processors 100 may determine that metal is disposed within fall protection device 11A if summed difference value is greater than the frequency change threshold value.

In some examples, to further ensure that metal is disposed within fall protection device 11A, processors 100 may determine difference values between previous resonant frequencies (e.g., measured resonant frequencies of the inductive sensors that were previously measured) and the current baseline resonant frequency values. Processors 100 may use both sets of difference values (e.g., difference values between measured resonant frequencies and current baseline resonant frequency values and difference values between previous resonant frequencies and current baseline resonant frequency values) to determine whether metal is disposed within the area of attachment of fall protection device 11A.

In the above example, processors 100 used the current baseline resonant frequency. Again, baseline resonant frequency is the resonant frequency of an inductive sensor when no metal is disposed within the area of attachment. Due to changes in the temperature, wear-and-tear, etc., the baseline resonant frequency may change for the inductive sensors. This disclosure, further below, describes examples for determining the current baseline resonant frequency.

Processors 100 may generate information indicating whether the fall protection device 11A is anchored to the support structure at least based in part on the determination of whether the support structure is within the area of attachment. For example, if determined that a metal support structure is within the area of attachment, processors 100 may generate a signal indicating as such. Communication unit 104 and/or output unit 112 may then output the information to hubs 14 or some other device that decide whether worker 10A is safely secured to the support structure. In some examples, processors 100 may be configured to determine whether worker 10A is safely secured to the support structure without needing to output the generated signal indicating that the metal support structure is within the area of attachment.

In some examples, communication unit 104 and/or output unit 112 may output information indicating whether fall protection device 11A is anchored to another one of fall protection devices 11. As an example, in a system of two or more fall protection devices 11, one (e.g., fall protection device 11A) serves as a bridge between the other fall protection devices 11 and all external computing devices (e.g., hub 14, PPEMS 6). This is done wirelessly. In some examples, fall protection devices 11 may already communicate with each other to maintain a synchronized state table, so each one of fall protection devices 11 is fully aware of the state of the other fall protection devices 11. As such, the external computing device may communicate with only one of fall protection devices 11 to determine the complete states of all fall protection devices 11.

Fall protection unit 108 may include any combination of hardware and software (e.g., executable by processors 100) to control the operation of a lock 109 (as described in greater detail, for example, with respect to FIGS. 10-12 below) incorporated in fall protection device 11A. As described herein, a lock may include any device capable of impeding or preventing fall protection device 11A from being disconnected from a support structure. As merely one example and as described in greater detail with respect to the example shown in FIG. 12, lock 109 may include a solenoid that extends to prevent the movement of one or more components of fall protection device 11A to impede or prevent fall protection device from being disconnected from a support structure. As another lock 109 keeps a movable gate of fall protection device 11A closed. Fall protection unit 108 may be configured to control the operation of lock 109 and/or feedback component 113, e.g., based on data from connection sensors 106.

Usage and environment sensors 110 may include a wide variety of sensors that capture data indicative of manner in which of fall protection device 11A is being used or an environment in which fall protection device 11A is disposed. For example, usage and environment sensors 110 may include accelerometers, location sensors, altimeters, or the like. In this example, an accelerometer may be configured to generate data indicative of an acceleration of fall protection device 11A with respect to gravity. An accelerometer may be configured as a single- or multi-axis accelerometer to determine a magnitude and direction of acceleration, e.g., as a vector quantity, and may be used to determine orientation, coordinate acceleration, vibration, shock, and/or falling. A location sensor may be configured to generate data indicative of a location of fall protection device 11A in one of environments 8. The location sensor may include a Global Positioning System (GPS) receiver, componentry to perform triangulation (e.g., using beacons and/or other fixed communication points), or other sensors to determine the relative location of fall protection device 11A. An altimeter may be configured to generate data indicative of an altitude of fall protection device 11A above a fixed level. In some examples, the altimeter may be configured to determine altitude of fall protection device 11A based on a measurement of atmospheric pressure (e.g., the greater the altitude, the lower the pressure). In addition, status and environment sensors 110 may include one or more sensors configured to measure wind speed, temperature, humidity, particulate content, noise levels, air quality, or any variety of other characteristics of environments in which fall protection device 11A may be used.

Output unit 112 may be configured to output data that is indicative of operation of fall protection device 11A, e.g., as measured by one or more sensors of computing device 98. In some examples, output unit 112 may directly output the data from the sensors of computing device 98. For example, output unit 112 may generate one or more messages containing real-time or near real-time data from one or more sensors of computing device 98 for transmission to another device via communication unit 104. However, in some instances, communication unit 104 may not be able to communicate with such devices, e.g., due to an environment in which fall protection device 11A is located and/or network outages. In such instances, output unit 112 may cache usage data to memory 102. That is, output unit 112 (or the sensors themselves) may store usage data to memory 102, which may allow the usage data to be uploaded to another device upon a network connection becoming available.

Output unit 112 may also be configured to generate an audible, visual, tactile, or other output that is perceptible by a user of fall protection device 11A. For example, output unit 112 may include one more user interface devices including, as examples, a variety of lights, displays, haptic feedback generators, speakers or the like. In one example, output unit 112 may include one or more light emitting diodes (LEDs) that are located on fall protection device 11A and/or included in a remote device that is in a field of view of a user of fall protection device 11A (e.g., indicator glasses, visor, or the like). In another example, output unit 112 may include one or more speakers that are located on fall protection device 11A and/or included in a remote device (e.g., earpiece, headset, or the like). In still another example, output unit 112 may include a haptic feedback generator that generates a vibration or other tactile feedback and that is included on fall protection device 11A or a remote device (e.g., a bracelet, a helmet, an earpiece, or the like). In still another example, output unit 112 may generate an electronic message for transmission to another computing device, such as end-user computing devices 16, computing devices 18, safety stations 15, hubs 14 (FIG. 1) or any other computing device.

As described above, processors 100 generate information indicating whether fall protection device 11A is anchored. In some examples, processors 100 may cause output unit 112 to output information to worker 10A indicating whether he/she is properly anchored based on the information indicating whether fall protection device 11A is anchored.

In operation, fall protection unit 108 (or another computing device capable of communicating with computing device 98) may use data from connection sensors 106 to determine whether fall protection device 11A is connected to a support structure. For example, fall protection unit 108 may receive data from connections sensors 106 that indicates a status or an operation of components of fall protection device 11A. Fall protection unit 108 may determine a connection status of a plurality of articles of fall protection device 11A based on the received data. For example, fall protection unit 108 may determine that a particular article of fall protection device 11A is connected to a support structure based on data indicating that components of fall protection device 11A have been moved to allow connection to the support structure and that the support structure is disposed within an area of attachment of fall protection device 11A.

In some instances, fall protection unit 108 may control the operation of lock 109 and/or feedback component 113 based on the determined connection status. For example, based on determining that fall protection device 11A of fall protection devices 11 is the only fall protection device that is connected to the support structure (e.g., according to the determined connection status), fall protection unit 108 may actuate lock 109 in order to impede or prevent fall protection device 11A from being disconnected from the support structure.

In some examples, lock 109 may be a secondary or tertiary lock of fall protection device 11A. For example, certain safety standards or codes may require at least two separate and deliberate actions for components of fall protection device 11A to move (e.g., for a gate to move), thereby allowing fall protection device 11A to connect to or disconnect from a support structure. As described in greater detail below with respect to FIGS. 10 and 11, each separate and deliberate action may be associated with a locking mechanism. According to aspects of this disclosure, lock 109 may prevent one or more of such locking mechanisms from being operated, e.g., from being opened to allow disconnection from the support structure.

Fall protection unit 108 may also release lock 109. For example, after actuating lock 109, fall protection unit 108 may continue to monitor whether fall protection device 11A is connected to the support structure. In the event that one or more other articles of fall protection device 11A are connected to the support structure, fall protection unit 108 may release lock 109 such that lock 109 no longer impedes fall protection device 11A from being disconnected from the support structure.

In the event that fall protection unit 108 actuates lock 109, output unit 112 may generate a signal that indicates lock 109 has been actuated. For example, as described above, output unit 112 may generate an audible, visual, and/or tactile output that indicates lock 109 has been actuated. In some examples, output unit 112 may additionally or alternatively generate an electronic message that indicates lock 109 has been actuated for transmission to another computing device, such as end-user computing devices 16, computing devices 18, safety stations 15, hubs 14 (FIG. 1) or any other computing device.

In some instances, lock 109 may incorporate a manual override. For example, a user may manually perform one or more actions to release lock 109 from a locked position to an unlocked position. In addition to or instead of the alerts described above, output unit 112 may generate a signal that indicates lock 109 has been manually overridden by a user of fall protection device 11A. For example, output unit 112 may generate an electronic message, an audible output, a visual output, and/or tactile output that indicates a manual override has been performed.

In some examples, rather than actuating lock 109 (or in addition to actuating lock 109), fall protection unit 108 may actuate feedback component 113 based on the determined connection status. For example, based on determining that a particular article of fall protection device 11A is the only fall protection device that is connected to the support structure (e.g., according to the determined connection status), fall protection unit 108 may generate alert data and transmit the alert data to feedback component 113. Upon receiving the alert data, fall protection device 11A may generate an alert that indicates that the fall protection device 11A is the only article of fall protection device that is connected to the at least one support structure. That is, in some examples, feedback component 113 may generate an audible alert (e.g., via one or more speakers), a visual alert (e.g., via one or more displays, light emitting diodes (LEDs) or the like), or a tactile alert (e.g., via a component of fall protection device 11A that vibrates or provides other haptic feedback). In other examples, as noted above, output unit 112 may generate an electronic message that indicates the connection status, e.g., for transmission to another device such as computing devices 18 (FIG. 1). In some examples, according to aspects of this disclosure, fall protection unit 108 may determine whether a fall has occurred. For example, fall protection unit 108 may receive data from connection sensors 106 that indicates a load being applied to fall protection device 11A. In response to the load exceeding a predetermined threshold, fall protection unit 108 may generate an audible, visual or tactile alert for output by output unit 112. In some examples, fall protection unit 108 may also determine a duration with which the load is applied, e.g., to determine not only that a user has fallen (thereby generating the load), but is also suspended post fall.

Figure 4A:
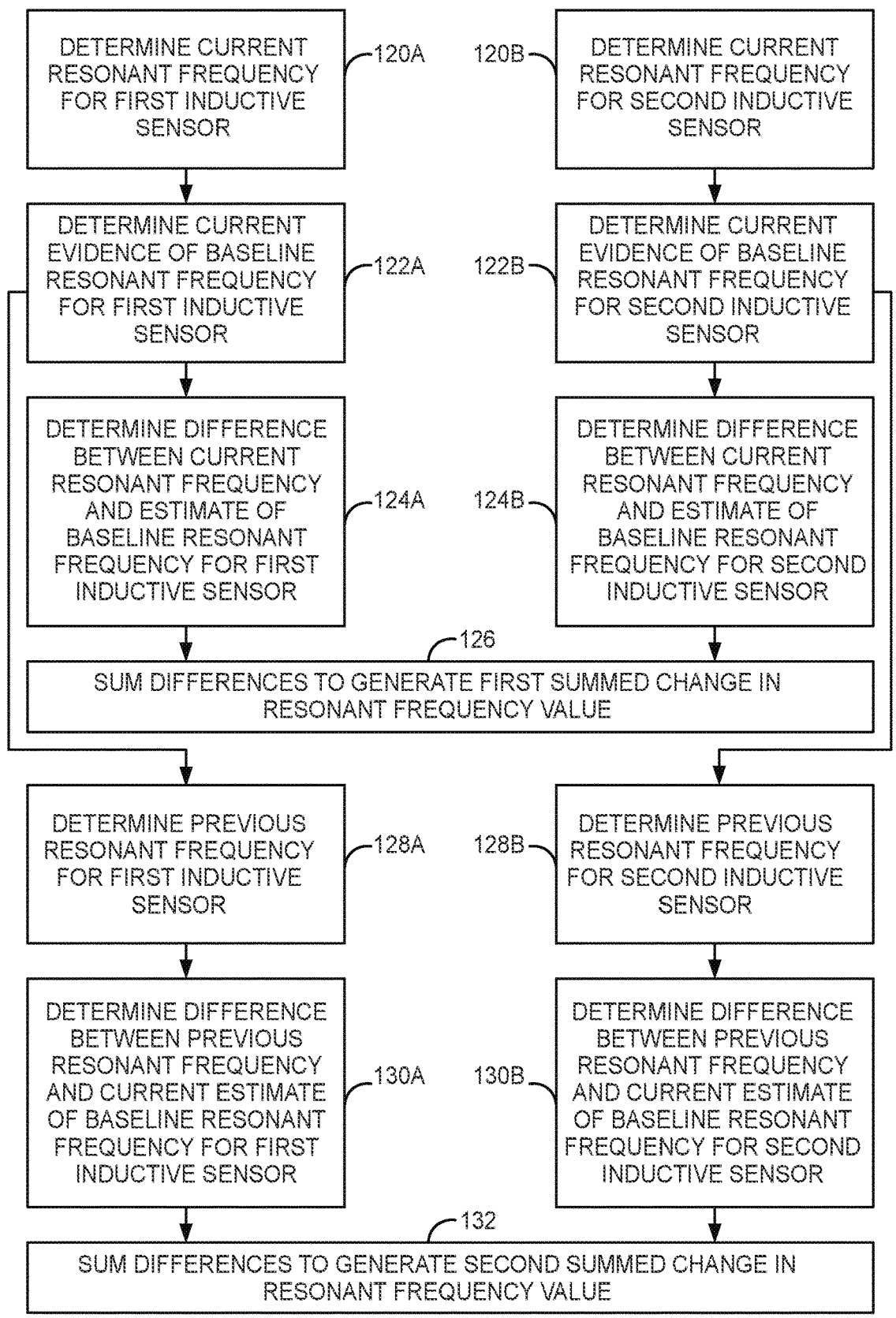
FIGS. 4A and 4B are flow diagrams that together illustrate an example process for determining whether a fall protection device is anchored to a support structure.
Figure 4B:
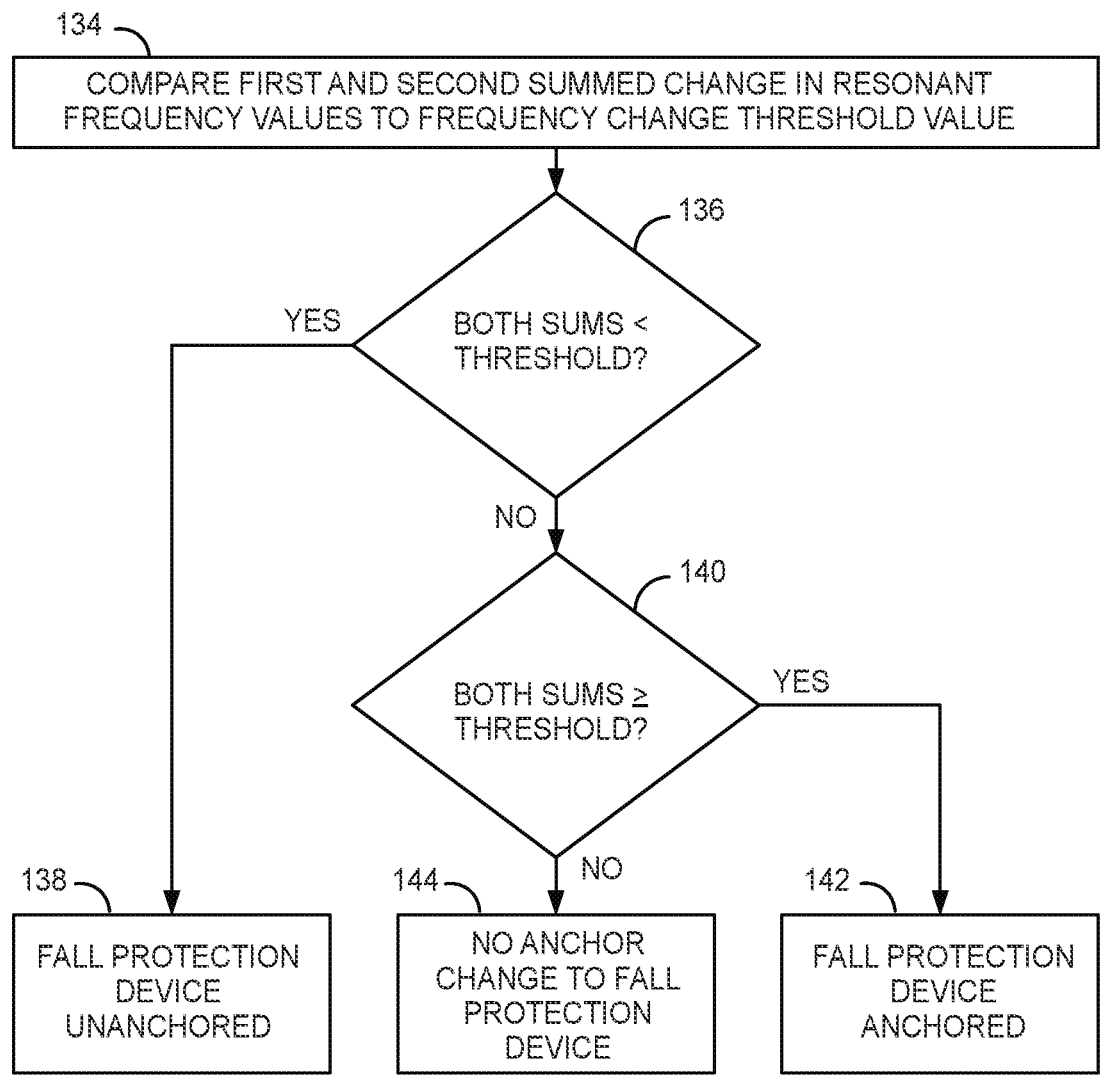

FIGS. 4A and 4B are flow diagrams that together illustrate an example process for determining whether a fall protection device is anchored to a metal structure. As described above, computing device 98 includes inductive sensing processor 101 configured to determine a resonant frequency of the inductive sensors of connection sensors 106. If the resonant frequency of an inductive sensor changes, the change may be indicative that there is a metal structure within an area of attachment of fall protection device 11A. If there is a metal structure within the area of attachment, in some examples, processors 100 may be configured to generate information indicating that fall protection device 11A is properly tied off (e.g., properly anchored). In some examples, processors 100 uses information indicating that the resonant frequency changed, and that the moveable gate of fall protection device 11A is closed to determine that fall protection device 11A is properly anchored.

For ease, the examples of FIGS. 4A and 4B are described with respect to processors 100. However, in some examples, processors 100 collects information indicative of the resonant frequencies and outputs such information to hubs 14, safety stations 15, computing device 16, and/or PPEMS 6, and one or more of hubs 14, safety stations 15, computing device 16, and/or PPEMS 6 determine whether fall protection device 11A is properly anchored. Accordingly, the example techniques described with respect to processors 100 may be performed by processors 100, one or more of hubs 14, safety stations 15, computing device 16, and/or PPEMS 6, or a combination thereof.

The examples of FIGS. 4A and 4B are described with respect to there being two inductive sensors in sensors 106. However, there may be only one inductive sensor in sensors 106 or three or more inductive sensors. The example techniques may operate in a substantially similar manner, except if there is only one inductive sensor, some of the summing operations described below are not be necessary.

In the examples of FIGS. 4A and 4B, the operations for the first and second inductive sensors are illustrated as occurring in parallel with one other. However, the examples of FIGS. 4A and 4B should not be considered so limited. The example operations for the first and second inductive sensors may occur substantially at the same time, overlapping in time, or sequentially. Also, example operations, described above, that utilize previously stored values, such as in memory 102, may retrieve the values and perform operations on the values in parallel, overlapping in time, or sequentially.

As illustrated, inductive sensing processor 101 determines a current resonant frequency for a first inductive sensor (120A), and determines a current resonant frequency for a second inductive sensor (120B). In one or more example, inducive sensing processor 101 is configured to periodically determine the resonant frequency of each of the inductive sensors (e.g., every 100-200 milliseconds (ms)). In some examples, inductive sensing processor 101 determines the resonant frequency of each of the inductive sensors more often if the moveable gate is closed, as compared to if the moveable gate is opened, thereby conserving power by not determining the resonant frequency as often when the gate is open.

One example way to determine the resonant frequency is for inductive sensing processor 101 to output a pulse having an input amplitude at different frequencies and measure the output amplitude for each of the frequencies. Inductive sensing processor 101 may determine a ratio between the output amplitude and the input amplitude for each of the frequencies of the pulse. The frequency at which the ratio of the output amplitude to the input amplitude is the greatest may be indicative of the resonant frequency, and inductive sensing processor 101 outputs information indicating the resonant frequency to processors 100 for further processing.

In FIG. 4A, processors 100 determine a current estimate of baseline resonant frequency for the first inductive sensor (122A), and a current estimate of baseline resonant frequency for the second inductive sensor (122B). Examples of techniques for determining the current estimate of baseline resonant frequencies are described in more detail with respect to FIGS. 5 and 6.

The baseline resonant frequency of an inductive sensor is the resonant frequency of the inductive sensor when there is no metal in proximity to the inductive sensor. Each of the inductive sensor is tuned for a particular resonant frequency (e.g., 4.5 MHz), and an initial estimate of the baseline resonant frequency may be the resonant frequency for which the inductive sensor was tuned. However, due to aging and other factors, the baseline resonant frequency may change. Accordingly, in some examples, processors 100 periodically determine the baseline resonant frequency of the inductive sensors.

Processors 100 use the baseline resonant frequencies to determine whether the current resonant frequencies are different than the baseline resonant frequencies. For example, processors 100 determine a difference between current resonant frequency and estimate of baseline resonant frequency for the first inductive sensor (124A). In this manner, processors 100 determine a first difference value indicating a change in a resonant frequency of the first inductive sensor. Processors 100 determine a difference between current resonant frequency and estimate of baseline resonant frequency for the second inductive sensor (124B). In this manner, processors 100 determine a second difference value indicating a change in a resonant frequency of the second inductive sensor.

In determining the difference, processors 100 subtract the estimate of the baseline resonant frequency, represented as "u", from the current resonant frequency, represented as "f," as measured by the inductive sensing processor. In other words, processors 100 determine (f−u) for the first inducive sensor and determine (f−u) for the second inductive sensor. The order of the operations (e.g., u is subtracted from f) may be useful in certain situations. For example, if metal is disposed within the area of attachment, at the resonant frequencies for which the inductive sensors are designed (e.g., approximately 4.5 MHz), the resonant frequency should increase. Therefore, if metal is disposed within the area of attachment, then (f−u) should be a positive number.

As another example, assume that the baseline resonant frequency is 100 kHz or lower. In such examples, if steel or iron is within the area of attachment, the resonant frequency should increase. If aluminum is within the area of attachment, the resonant frequency should decrease. Therefore, if (f−u) is a positive number, then processors 100 may determine that steel or iron is within the area of attachment, but if (f−u) is a negative number, the processor 100 may determine that aluminum is within the area of attachment. Whether the resonant frequency shifts upwards or downwards may be a factor of the permeability, the metal type, and resonant frequency. For a high resonant frequency (e.g., 1 MHz or greater), the permeability may not affect the resonant frequency. But for low resonant frequency (e.g., 100 kHz or lower), the permeability may affect the resonant frequency. In some examples, at lower baseline resonant frequencies, iron or steel cause the resonant frequency to shift upwards, but aluminum causes the resonant frequency to shift downwards, and the direction of shift is used to determine the type of metal within the area of attachment.

As noted above, the inductive sensors are configured for a resonant frequency of approximately 1 MHz or greater such as 4.5 MHz. One reason for selecting such a high resonant frequency is that inductive coupling from metal (e.g., metal commonly suitable as support structures for fall protection devices 11) may only cause the resonant frequency to increase. If the resonant frequency were selected at a lower frequency, the inductive coupling from the metal may cause the resonant frequency to increase or decrease due to the permeability of the metal. For example, if the resonant frequency for which the inducive sensors are configured is too low, then it may be possible that eddy currents cause the resonant frequency to increase, but the coupling due to the permeability of the metal causes the resonant frequency to decrease, resulting in no or little overall change in the resonant frequency. In this case, although metal is disposed within the area of attachment, there may not be change in the resonant frequency, and processors 100 may incorrectly determine that there is no metal within the area of attachment. By selecting a sufficiently high resonant frequency for the inductive sensors, the effects of the permeability may be negated, and the resonant frequency consistently increases when metal is disposed within the area of attachment.

In some examples, the permeability of the metal may be used as an advantage to determine the type of metal within the area of attachment. For instance, if the baseline resonant frequency is set to be relatively low (e.g., 100 kHz), processors 100 may determine the direction of shift (e.g., upwards or downwards relative to the baseline resonant frequency) to determine the type of metal.

In the example illustrated in FIG. 4A, processors 100 sum the differences (e.g., sum the first difference value and the second difference value) to generate a first summed change in resonant frequency value (126). In examples where there is only one inductive sensor, processors 100 may not perform such summing, and in such examples, the first summed change in resonant frequency value is equal to the first difference value. In examples where there are three or more inductive sensors, processors 100 may sum the difference values for all of the inductive sensors to generate a first summed change in resonant frequency value.

In some examples, processors 100 rely on the first summed change in resonant frequency value to determine whether a metal structure is disposed within an area of attachment of fall protection device 11A to ensure that proper anchoring. For example, processors 100 determine whether the first summed change in resonant frequency is greater than a frequency change threshold value (e.g., 5 kHz). If the first summed change in resonant frequency is greater than the frequency change threshold value, processors 100 determine that metal is disposed within the area of attachment, and if the gate is closed, generate information indicating that that fall protection device 11A is anchored. If the first summed change in resonant frequency is less than or equal to the frequency change threshold value, processors 100 determine that metal is not disposed within the area of attachment, and generate information indicating that fall protection device 11A is not anchored or tied off.

The frequency change threshold value may be based on the baseline resonant frequency. For example, an electronic circuit having a baseline resonant frequency of 4.5 MHz may need a frequency change threshold of 5 kHz to detect particular metal support structure and reject environmental noise. However, an electronic circuit having a baseline resonant frequency of 8 MHz may need a frequency change threshold of 10 kHz for detection and rejection of environmental noise.

However, to further ensure accuracy in the determination of whether fall protection device 11A is anchored, processors 100 may rely on previous resonant frequency measurements of the first and second inductive sensors. Inductive sensing processor 101 stores the measured resonant frequency values in memory 102. In some examples, processors 100 determine a previous resonant frequency for the first inductive sensor (128A), and a previous resonant frequency for the second inductive sensor (128B). As one example, the previous resonant frequency for the first and second inductive sensors may be the immediately preceding measured resonant frequencies (e.g., the resonant frequency values measured immediately before the current measured resonant frequencies).

Processors 100 determine a difference between the previous resonant frequency of the first inductive sensor and the current estimate of baseline resonant frequency for the first inductive sensor (130A). In this example, the previous resonant frequency is the value that processors 100 retrieved from memory 102 that was previously determined by inductive sensing processor 101 as the resonant frequency for the first inductive sensor, but the baseline resonant frequency is the current estimate of the baseline resonant frequency, and not a previous estimate. Processors 100 determine a difference between the previous resonant frequency of the second inductive sensor and the current estimate of baseline resonant frequency for the second inductive sensor (130B). In this example, the previous resonant frequency is the value that processors 100 retrieved from memory 102 that was previously determined by inductive sensing processor 101 as the resonant frequency for the second inductive sensor, but the baseline resonant frequency is the current estimate of the baseline resonant frequency, and not a previous estimate.

In the example illustrated in FIG. 4A, processors 100 sum the differences to generate a second summed change in resonant frequency value (132). Referring to FIG. 4B, processors 100 compare the first and second summed change in resonant frequency values to the frequency change threshold value (134), and determine whether a metal support structure is within the area of attachment of fall protection device 11A based on the comparison.

For example, processors 100 determine whether both the first and second summed change in resonant frequency values are less than the frequency change threshold value (136). If both the first and second summed change in resonant frequency values are less than the frequency change threshold value (YES of 136), then processors 100 may determine that fall protection device 11A is unanchored and generate information indicating that fall protection device 11A is unanchored. In some examples, processors 100 may determine that fall protection device 11A is anchored, even if both the first and second summed change in resonant frequency values are less than the frequency change threshold value. For instance, as described below, if processors 100 had previously determined that fall protection device 11A was anchored, and since then, processors 100 have not determined that the gate opened, then processors 100 may determine that fall protection device 11A is anchored even if both the first and second summed change in resonant frequency values are less than the frequency change threshold value.

If processors 100 determine that both the first and second summed change in resonant frequency values are not less than the frequency change threshold value (NO of 136), then one or may be both of first and second summed change in resonant frequency values is greater than the frequency change threshold value. Processors 100 may determine whether both the first and second summed change in resonant frequency values are greater than or equal to the frequency change threshold value (140).

If both the first and second summed change in resonant frequency values are greater than or equal to the frequency change threshold value (YES of 140), processors 100 may determine that fall protection device 11A is anchored (142). Processors 100 may generate information indicating that fall protection device 11A is anchored. In some examples, processors 100 may only determine that the area of attachment surrounds a support structure when both the first and second summed change in resonant frequency values are greater than or equal to the frequency change threshold value. In such examples, processors 100 may not determine that fall protection device 11A is anchored unless two conditions are met: (1) both the first and second summed change in resonant frequency values are greater than or equal to the frequency change threshold value, and (2) that the moveable gate is closed (e.g., a gate of fall protection device 11A is in a closed position).

If both the first and second summed change in resonant frequency values are not greater than or equal to the frequency change threshold value (NO of 140), processors 100 may determine that there is no change in the status of fall protection device 11A (144). If processors 100 had previously determined that fall protection device 11A was anchored, then processors 100 may keep the status of fall protection device 11A as anchored, and if processors 100 had previously determined that fall protection device 11A was unanchored, then processors 100 may keep the status of fall protection device 11A as unanchored.

In some examples, summing difference values of the differences between current resonant frequency and estimate of baseline resonant frequency may be optional. For instance, processors 100 may determine whether the difference values for any of the inductive sensors is greater than the frequency change threshold value, and only if the difference values for any of the inductive sensors is greater than the frequency change threshold value do processors 100 determine that fall protection device 11A is anchored (or at least that, an area of attachment of fall protection device 11A surrounds a support structure). Again, a difference value here refers to a subtraction of the current estimate of the baseline resonant frequency for an inductive sensor from its current resonant frequency.

However, summing the difference values, as described above with respect to FIG. 4A, may be beneficial. In some examples, due to the location of the support structure within the area of attachment, the support structure may partially couple with one of the inductive sensors, and partially couple with other inductive sensors. For example, due to the location of the support structure within the area of attachment, the support structure may couple with the first inductive sensor in such a way to increase its resonant frequency by 2 kHz, and couple with the second inductive sensor in such a way to increase its resonant frequency by 4 kHz. If the frequency change threshold value was 5 kHz, then, in this case, processors 100 may not determine that a support structure is within the area of attachment if processors 100 compare each difference value to the threshold because 2 kHz and 4 kHz are both less than 5 kHz. If the sum is used, then processors 100 may correctly determine that a support structure is within the area of attachment because 6 kHz (2 kHz+4 kHz) is greater than 5 kHz.

Also, relying upon both the first summed change in resonant frequency and the second summed change in resonant frequency for determine whether fall protection device 11A is anchored or unanchored may be beneficial. In some examples, the inductive sensing processor may determine the resonant frequencies every 100 ms to 500 ms. If two consecutive measurements of the resonant frequencies indicate that fall protection device 11A is anchored or unanchored, then there is high likelihood that fall protection device 11A is truly anchored or unanchored. If, however, two consecutive measurements of the resonant frequencies do not indicate that fall protection device 11A is anchored or unanchored, then it is possible that one of the two measurement is incorrect, and for safety, processors 100 may not change the status of fall protection device 11A.

In some examples, baseline resonant frequency measurements may be not needed, and the example techniques may be performed based on rate of changes in the resonant frequencies of the electronic circuits of the inductive sensors. For example, processors 100 or inductive sensing processor 101 store measured resonant frequency values in memory 102. Processors 100 may determine the change in frequency of the measured frequency values over time (e.g., frequency gradient). Because the resonant frequency should increase when the electronic circuit is in presence of a support structure, a high-slope positive frequency gradient may mean that fall protection device 11A moved close to the support structure. Likewise, a high-slope negative frequency gradient may mean that fall protection device 11A moved away from a support structure.

In this case, the threshold may be on the frequency gradient rather than on a particular absolute frequency (e.g., change in X Hz/sec rather than 5 kHz). The gradient threshold may be chosen to be high enough to be unlikely to be caused by natural frequency drift or environmental noise, perhaps something like 100 kHz/s. Furthermore, the gradient thresholds may be different for identifying the state transitions. As one example, a first threshold of +80 kHz/s may be for identifying arrival at an anchor (e.g., a support structure is arriving within fall protection device 11A) and −50 kHz/s for identifying departure from an anchor (e.g., a support structure is leaving from fall protection device 11A).

In the examples illustrated in FIGS. 4A and 4B, processors 100 and/or inductive sensing processor 101 determine a change in a resonant frequency of the electronic circuit of an inductive sensor, and determine whether a support structure is within an area of attachment based on the change in the resonant frequency. In the examples illustrated in FIGS. 4A and 4B, the change in the resonant frequency is a change measured in difference of Hertz, and based on whether the difference is sufficient, processors 100 may generate information indicating whether the fall protection device 11A is anchored to the support structure.

Figure 15:
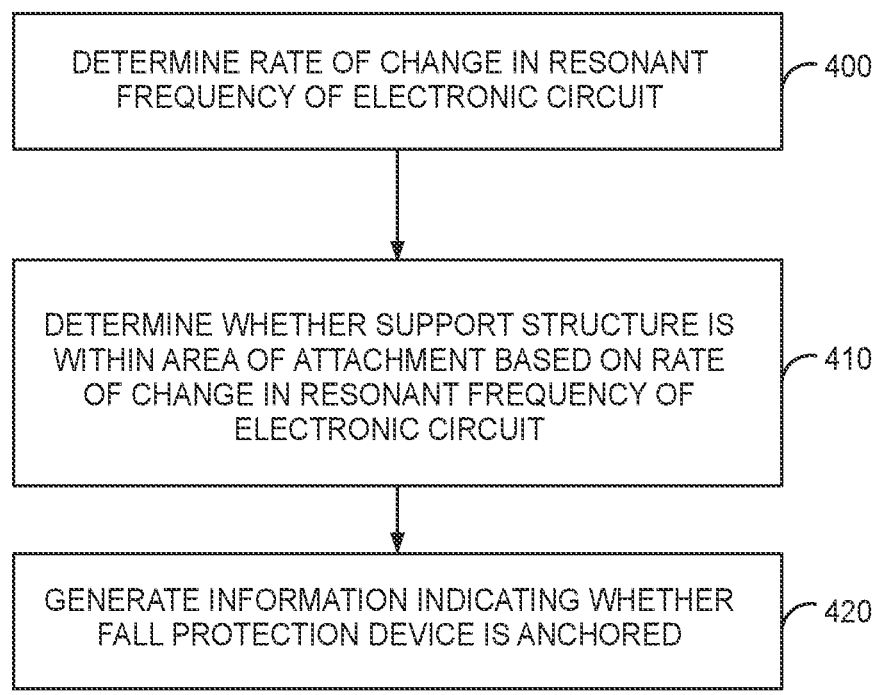
FIG. 15 is a flow diagram illustrating another example for determining whether a fall protection device is anchored to a support structure.

In the example illustrated in FIG. 15, processors 100 and/or inductive sensing processor 101 may determine a change in a resonant frequency of the electronic circuit of the inductive sensor. However, processors 100 and/or inductive sensing processor 101 may determine a rate of change in a resonant frequency of the electronic circuit of the inductive sensor (400). For example, processors 100 may determine how fast the resonant frequency changed, and whether the resonant frequency increase (e.g., positive slope), or decreased (e.g., negative slope). In this example, a change in the resonant frequency refers to the rate of change of the resonant frequency.

In FIG. 15, to determine whether a support structure is within an area of attachment based on the change in the resonant frequency, processors 100 may determine whether the support structure is within the area of attachment of fall protection device 11A based on the rate of change in the resonant frequency (410). For example, if the rate of change is positive and greater than first threshold, then processors 100 may determine that the support structure is within the area of attachment. If the rate of change is negative and the absolute value is greater than a second threshold, then processors 100 may determine that the support structure is not within the area of attachment. The first and second threshold values may be difference.

Similar to above, processors 100 may generate information indicating whether fall protection device 11A is anchored (420). For example, fall protection device 11A may generate audible, visual, or haptic feedback, the other types of information described to indicate whether fall protection device 11A is anchored, or other types of feedback.

Figure 5:
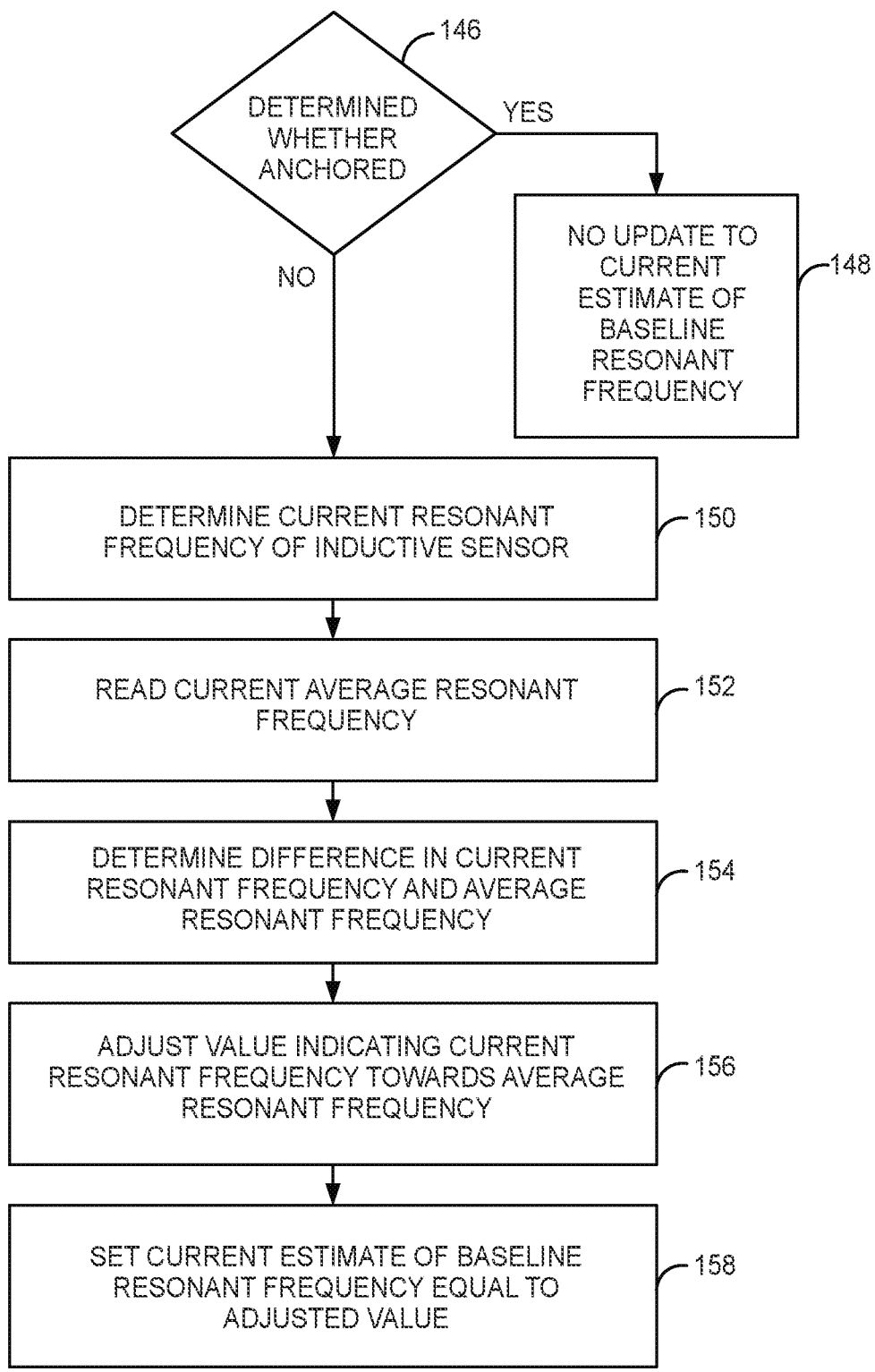
FIG. 5 is a flow diagram illustrating an example process for determining a baseline resonant frequency of inductive sensors of a fall protection device.

FIG. 5 is a flow diagram illustrating an example process for determining a baseline resonant frequency of inductive sensors of a fall protection device. In the example, of FIGS. 4A and 4B, processors 100 determined the estimate of the baseline resonant frequency. FIG. 5 illustrates examples of techniques for determining the current estimate of the baseline resonant frequency. The example of FIG. 5 is described with respect to one inductive sensor, but the example techniques are applicable to the other inductive sensors as well.

As described above, inducive sensing processor 101 periodically determines the resonant frequencies of the inductive sensors. The operations illustrated in FIG. 5 may start in response to inducive sensing processor 101 determining the resonant frequencies.

For example, processors 100 determine whether fall protection device 11A was previously determined as being anchored (e.g., based on the results of the operations of FIGS. 4A and 4B) (146). Initially, such as until processors 100 have made a determination that fall protection device 11A is anchored, processors 100 may be configured to determine that fall protection device 11A is unanchored. However, even if assumed that fall protection device 11A is unanchored, but fall protection device 11A is actually anchored, as described in more detail, the example techniques may correct for this incorrect initial state.

If processors 100 had previously determined that fall protection device 11A is anchored (YES of 146), then processors 100 do not update the estimate to the baseline resonant frequency (148). For instance, if determined that fall protection device 11A was previously determined to be anchored, then a metal support structure is within the area of attachment. As described above, the baseline resonant frequency is the frequency of an inductive sensor when the metal support structure is not within the area of attachment. Hence, if the metal support structure is within the area of attachment, a measurement of the resonant frequency would not be a measurement of a baseline resonant frequency.

If processors 100 had previously determined that fall protection device 11A is not anchored (NO of 146), then the inductive sensing processor determines the current baseline resonant frequency of an inducive sensor (150). If fall protection device 11A was previously determined to not be anchored, then metal structure may not be within the area of attachment, and the measurement may be an actual measurement of the baseline resonant frequency.

In some examples, processors 100 set the measured baseline resonant frequency as the estimated baseline resonant frequency. However, there is variability in how much the baseline resonant frequency changes from one measurement to another, or there may be errors in the measurement. Accordingly, processors 100 may apply a smoothing algorithm so that the estimate of the baseline resonant frequency does not shift drastically and lessens the effect from erroneous measurements.

For example, processors 100 read current average resonant frequency of the inductive sensor (152). The current average resonant frequency is indicative of a running average of baseline resonant frequency values that processors 100 utilize to control the amount by which processors 100 adjust the measured baseline resonant frequency. Memory 102 may be configured to store values of the measured baseline resonant frequencies. For example, when the inductive sensing processor determines a resonant frequency, the inductive sensing processor may store a value indicative of the resonant frequency in memory 102. For each of the resonant frequency values, processors 100 may indicate whether the value corresponds to a baseline resonant frequency or not. For example, when determined that fall protection device 11A is not anchored (e.g., NO of 146), for resonant frequency measurements taken by the inductive sensing processor, processors 100 may identify these resonant frequency measurements as baseline resonant frequency values. When determined that fall protection device 11A is anchored (e.g., YES of 146), for resonant frequency measurements taken by the inductive sensing processor, processors 100 may identify these resonant frequency measurements as not being baseline resonant frequency values.

In some examples, processors 100 determine the current average resonant frequency based on the actual measured baseline resonant frequencies, and not based on any smoothing that may have been performed. Examples of techniques to determine the current average resonant frequency is described in more detail with respect to FIG. 6.

Processors 100 determine a difference between the current resonant frequency of the inductive sensor and the current average resonant frequency of the inductive sensor (154). Processors 100 determine the current estimate of the baseline resonant frequency based on the difference. For example, processors 100 may adjust a value indicating the current resonant frequency towards the current average resonant frequency of the inductive sensor based on the difference to determine an adjusted value. Processors 100 set the current estimate of the baseline resonant frequency equal to the adjusted value (158). This estimate of the baseline resonant frequency is what processors 100 use when performing the example operations of FIGS. 4A and 4B.

As an example, processors 100 adjust the measured baseline resonant frequency towards the current average resonant frequency in a rate-limited fashion (e.g., add or subtract only a portion of the difference, such as 5%). For example, if the difference between the current average resonant frequency and the measured baseline resonant frequency is "X," and the current average resonant frequency is greater than the measured baseline resonant frequency, then processors 100 add 0.05*X to the measured baseline resonant frequency value. Processors 100 set the value for the estimate of the baseline resonant frequency equal to (measured baseline resonant frequency+0/05*X). By slowly increasing the estimate of the baseline resonant frequency, the stability of the overall system may be improved. For example, slow adaptation (e.g., slowly increasing the estimate of the baseline resonant frequency) may be analogous to low-pass filter, reducing the effects of transient environmental noise.

Figure 6:
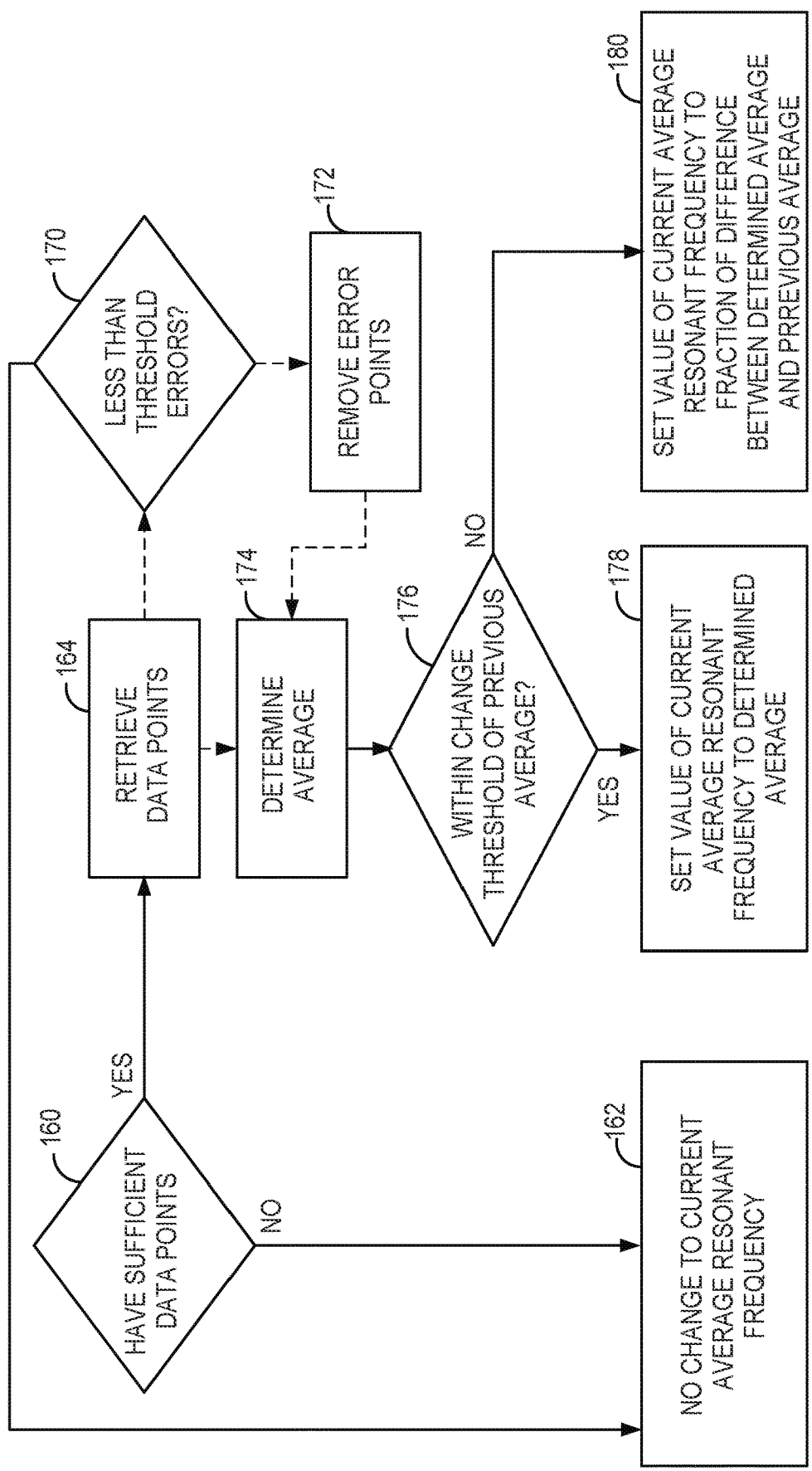
FIG. 6 is flow diagram illustrating an example process for determining an average resonant frequency used for determining the baseline resonant frequency of FIG. 5.

FIG. 6 is flow diagram illustrating an example process for determining an average resonant frequency used for determining the baseline resonant frequency of FIG. 5. Processors 100 may determine whether there are sufficient data points (e.g., sufficient number of baseline resonant frequency measurements from the inductive sensing processor stored in memory 102) (160). The set of data points is referred to as a window of resonant frequency measurements. As one example, the number of data points (e.g., size of the window) is five. If there are not sufficient number of baseline resonant frequency measurements (NO of 160), processors 100 may not update the value of the current average resonant frequency (162).

If there are sufficient number of baseline resonant frequency measurements (YES of 160), processors 100 retrieve the baseline resonant frequency measurements from memory 102 (164). Processors 100 determine an average of the retrieved baseline resonant frequency measurements (174). Examples of the average as used in this disclosure refers to the mean, median, or mode, and includes examples where any weighting is applied to the values. Averaging refers to any technique to perform operations on a set of numbers to output a single number, and examples of such operations are mean, mode, and median.

In some examples, rather than performing an average on the retrieved baseline resonant frequency measurements, processors 100 may determine whether there are any errors in the baseline resonant frequency measurements and whether the errors are less than a threshold number of errors (170). An error in a baseline resonant frequency measurement may be where the baseline resonant frequency value is greater than or less than a maximum or minimum value. An error in a baseline resonant frequency measurement may be where the baseline resonant frequency value deviates from the other baseline resonant frequency values by more than a deviation threshold. Other example ways to determine if there are error values in the baseline resonant frequency measurement are possible.

If there are not less than a threshold number of errors (NO of 170), processors 100 may not update the value of the current average resonant frequency (162). If there are less than or equal to a threshold number of errors (YES of 170), processors 100 remove the error values from the retrieved baseline resonant frequency measurements (172), and determine the average by using remaining baseline resonant frequency measurements (174). In some examples, processors 100 substitute values for the erroneous baseline resonant frequency measures. For example, processors 100 determine the average by using additional baseline resonant frequency measurements from memory 102 and the remaining baseline resonant frequency measurements. In some examples, processors 100 interpolate additional values from the remaining baseline resonant frequency measurements, and determine the average by using he interpolated values and the remaining baseline resonant frequency measurements. Other ways in which to substitute values for the erroneous values are possible.

In some examples, processors 100 set the determined average value as the current average resonant frequency. However, in some examples, processors 100 determines whether to set the determine average value as the current average resonant value based on whether there is sufficient difference between the determined average resonant frequency and a previous average of the resonant frequency of a window of resonant frequency measurements.

For example, processors 100 determine a difference value indicative of a difference in the determined average resonant frequency and a previous average of the resonant frequency, and determine whether the difference is less than or equal to an average frequency change threshold value (176). If the difference value is less than or equal to the average frequency change threshold value (YES of 176), then processors 100 set a value of the current average resonant frequency equal to the current average value (178). If the difference value is not less than or equal to the average frequency change threshold value (NO of 176), then processors 100 set a value of the current average resonant frequency equal to a weighted average of the current average value and the previous average value (180). For example, processors 100 may determine a fraction of the difference (e.g., 50% of the difference) between the determined average resonant frequency value and the previous average of the resonant frequency. Processors 100 add the fractional value to the determined average resonant frequency value if the previous average of the resonant frequency is greater than the determined average resonant frequency, and set the resulting value as a value of the current average resonant frequency. Processors 100 subtracts the fractional value from the determined average resonant frequency value if the previous average of the resonant frequency is less than the determined average resonant frequency, and set the resulting value as a value of the current average resonant frequency.

Figure 7:
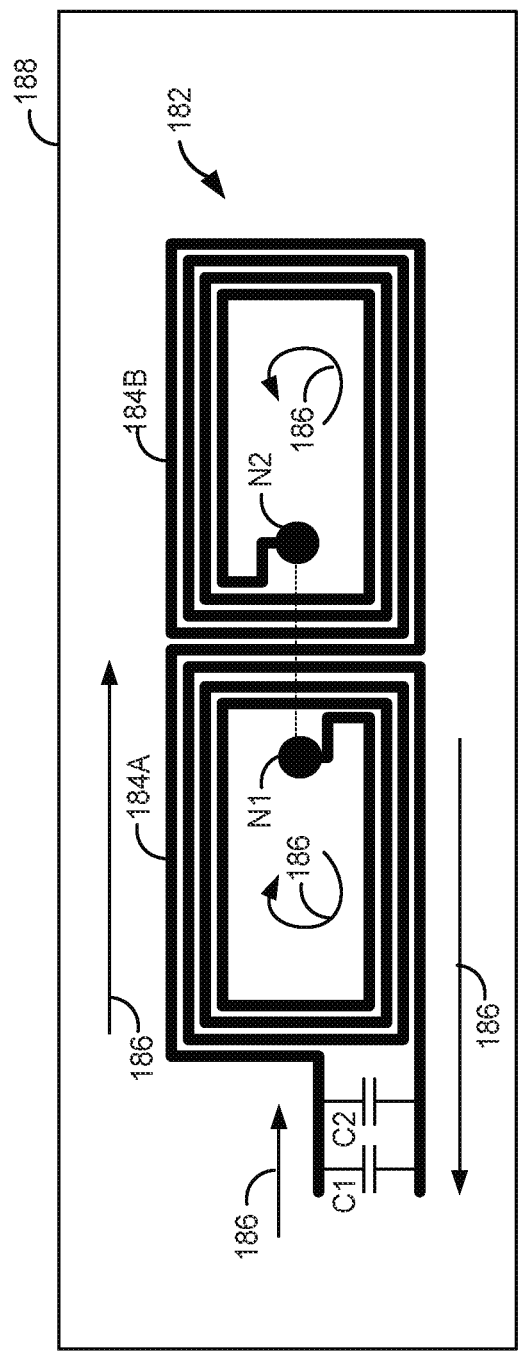
FIG. 7 is a conceptual diagram illustrating an example inductive sensor of a fall protection device.

FIG. 7 is a conceptual diagram illustrating an example inductive sensor of a fall protection device. FIG. 7 illustrates inductive sensor 182, that as one example includes an electronic circuit having capacitors C1 and C2 and an inductor formed with coils 184A and 184B. In FIG. 7, the inductor is formed by coils 184A and 184B coupled together via a jumper or through printed circuit board (PCB) 188 on which coils 184A and 184B are formed. One example of PCB 188 is a thin sheet (e.g., 0.35 mm thick±10%) of FR4 material, and in some examples, the sheet for FR4 material is flexible to be bend around a bowl of fall protection device 11A. The bowl of fall protection device 11A partially surrounds (e.g., may not completely enclose) the area of attachment of fall protection device 11A. The area of attachment of fall protection device 11A and the bowl of fall protection device 11A are illustrated and described in more detail in FIG. 10.

In the example of FIG. 7, coils 184A and 184B form a general shape of lemniscate (e.g., figure "8"). Coils 184A and 184B include one or more turns, and in the example of FIG. 7, coils 184A and 184B each include four turns. A turn is one loop through coils 184A or 184B.

Coil 184A terminates at node N1, and coil 184B terminates at node N2. Nodes N1 and N2 may be coupled via a jumper connection to form a single inductor. In some examples, coil 184A is formed on a first side of PCB 188, and coil 184B is formed on a second, opposite side of PCB 188. In such examples, N1 and N2 may be coupled with plated vias that are formed through PCB 188 to form a single inductor. In one example, the inductance of the inductor formed by coils 184A and 184B is approximately 1 microHenry (uH) and formed with approximately (e.g., ±10%) 9 mm wide copper with a total length of approximately (e.g., ±10%) 50 mm. The size and inductance of the inductor is provided as one example, and should not be considered limiting. In general, the size of the inductor may be a function of the size and shape of fall protection device 11A, as well as available space within fall protection device 11A and the flexibility of PCB 188. Accordingly, the size of the inductor, and hence its inductance, are a matter of design choice and may be different than the examples described in this disclosure.

The electronic circuit of inductive sensor 182 also includes one or more capacitors connected in a parallel with the inductor forming a so-called "LC resonant circuit." As illustrated, the electronic circuit of inductive sensor 182 includes capacitors C1 and C2 connected in parallel with the inductor. A resonant frequency of the LC resonant circuit of inductive sensor 182 is based on the inductance of the inductor and the capacitance of C1 and C2. The equation for the resonant frequency of the LC resonant circuit is $1/(2*pi*sqrt(L*C))$, where pi is approximately 3.1415, sqrt( ) is the square-root operation, L is the inductance, and C is the total capacitance.

In one example, the baseline resonant frequency of the LC resonant circuit of inductive sensor 182 is approximately 4.5 MHz. Again, the baseline resonant frequency refers to the resonant frequency of the electronic circuit when a metal support structure is not proximate to the electronic circuit. If the inductance is 1 uH, then the total capacitance from C1 and C2 is 1240 pico-Farad (pF) to achieve 4.5 MHz. For example, C1 is approximately 1000 pF, and C2 is approximately 240 pF. As another example, if the inductance is 3.25 uH and the total capacitance is 390 pF, then the baseline resonant frequency is approximately 4.5 MHz.

Although two capacitors are shown, in some examples, there may be only one capacitor, and in some examples, there may be more than two capacitors coupled in parallel. The number of capacitors may be a function of the size and shape of the capacitors, as well as the flexibility of PCB 188. If the desired resonant frequency is different than 4.5 MHz, then the inductance and capacitance may be adjusted accordingly to achieve the desired resonant frequency.

When a support structure is within an area of attachment of fall protection device 11A, the resonant frequency of the electronic circuit (e.g., LC resonant circuit) of inductive sensor 182 shifts. As one example, when a metal anchor is within the area of attachment of fall protection device 11A, the resonant frequency of the electronic circuit shifts up due to eddy currents produced in the support structure. For example, the eddy currents in the support structure cause the effective inductance of the inductor to reduce, and a reduction in the effective inductance causes the resonant frequency of the electronic circuit to shift up. In one example, if the support structure is proximate to the electronic circuit, the resonant frequency shifts up by approximately 5 kHz or more. As described above, the shift in the resonant frequency may be indicative of whether the support structure is within the area of attachment of fall protection device 11A. Also, the amount by which the resonant frequency shifts may be a function of the baseline resonant frequency.

In some examples, the support structure may also affect the total capacitance of the electronic circuit of inductive sensor 182. For example, each turn of coils 184A and 184B creates capacitance within coils 184A and 184B. A metal support structure proximate to inductive sensor 182 may increase the capacitance between the turns of coils 184A and 184B, which also contributes to the shift the resonant frequency of the electronic circuit of inductive sensor 182.

Whether the resonant frequency of the electronic circuit of inductive sensor 182 shifts upwards (i.e., adds too) or downwards (i.e., subtracts from) relative to the baseline resonant frequency (e.g., resonant frequency of the electronic circuit when no metal is proximate to the electronic circuit) is based on the baseline resonant frequency and the type of metal. For example, the conductance and permeability of the metal affect whether the resonant frequency shifts up or down. The amplitude of eddy currents may be based on the conductance of the metal, and the higher the amplitude of eddy currents, the more the effective inductance of the electronic circuit is decrease, leading to an increase in the resonant frequency. However, the permeability of the metal may cause the effective inductance to increase, thereby causing a decrease in the resonant frequency.

At high resonant frequencies, such as 4.5 MHz or greater, the effects of the permeability of the metal are minimized. Accordingly, in the example where the baseline resonant frequency of the electronic circuit is approximately is 4.5 MHz, there may not be affects from the permeability of the support structure, and the resonant frequency may shift only upwards in response to a support structure being proximate to inductive sensor 182.

In some examples, forming the electronic circuit to have a lower baseline resonant frequency may be useful for determining the type of metal. As one example, the baseline resonant frequency of the electronic circuit is less than 100 kHz, which is below the typical fall-off in permeability of steel. In such examples, if the support structure is a steel support structure and is proximate to inductive sensor 182, the resonant frequency of the electronic circuit may shift downward from the baseline resonant frequency of 100 kHz. However, if the support structure is an aluminum support structure and is proximate to inductive sensor 182, the resonant frequency of the electronic circuity may shift upward from the baseline resonant frequency of 100 kHz. Accordingly, based on whether the resonant frequency shifted upwards or downwards, processors 100 may determine the type of metal (e.g., whether the support structure is steel or aluminum).

The lemiscate form of coils 184A and 184B may provide immunity to external magnetic fields that may perturb operation of inductive sensor 182. For example, in FIG. 7, coils 184A and 184B are wound in opposite directions relative to one another. Accordingly, a distant magnetic field (e.g., one not produced by inductive sensor 182) may couple approximately equally into each of coils 184A and 184B. Since coils 184A and 184B are wound in opposite directions relative to one another, the signal produced by the external magnetic field in coils 184A tends to cancel the signal produced in coils 184B.

For example, FIG. 7 illustrates current path 186 through coils 184A and 184B, where current path 186 is an example of how a current flows through inductive sensor 182. The flow of current may be part of determining the resonant frequency of the electronic circuit of inductive sensor 182. As illustrated, current path 186 starts from the left-side of the inductor, through the top of coils 184A, and then the current through current path 186 flows counter-clockwise through coils 184B until reaching node N2. Current path 186 proceeds from node N2 to node N1, and the current through current path 186 flows clockwise through coils 18A, and then exits at the bottom of the left-side of the inductor. In this example, because the current flows clockwise through coils 184A and counter-clockwise through coils 184B, coils 184A and 184B may be considered as being wound in opposite directions relative to one another.

The current flowing through current path 186 causes an electromagnetic field to form in the area of attachment of fall protection device 11A. Eddy currents then form in a metal support structure responsive to the metal structure being in the area of attachment. The eddy currents then cause coupling with the inductor and lower the effective overall inductance. Accordingly, inductive sensor 182 may be positioned and oriented in a such a manner to cause the electromagnetic field to be generated within the area of attachment.

Although the examples are described with coils 184A and 184B forming a general shape of a lemiscate, the techniques described in this disclosure are not so limited. In some examples, rather than using coils 184A and 184B, the inductor of the electronic circuit of inductive sensor 182 may be formed with one coil. In some examples, the inductor of the electronic circuit of inductive sensor 182 may be formed with more than two sets of coils (e.g., more than coils 184A and 184B). Also, the form need not necessarily be of a lemiscate. For example, coils 184A and 184B may be formed as ovals that are not arranged in a way so as to form a figure "8."

In FIG. 7, each of the turns of coils 184A and 184B are illustrated as being formed on the surface of PCB 188. In some examples, coils 184A and 184B may be arranged in three-dimensional space such that coils 184A and 184B extend vertically out from PCB 188. Moreover, as described above, although coils 184A and 184B are shown as being on the same side of PCB 188, the example techniques are not so limited. For example, coils 184A may be on a first side of PCB 188, and coils 184B may be on a second side of PCB 188. By having coils 184A and 184B on different sides, each of coils 184A and 184B may include more turns and thus a higher inductance relative to the example where coils 184A and 184B are on the same side. A higher inductance results in a higher quality (Q) factor of the electronic circuit (all else being equal) and higher effective parallel resistance. Having higher Q factor and higher effective parallel resistance may be beneficial because some integrated circuits that are used for inductive sensing have a minimum parallel resistance requirement, and also having a higher Q gives a sharper resonant peak, resulting in more accurate detection of the resonant frequency.

The parallel resistance (Rp) is the impedance of the circuit at resonance and is a purely real number (complex component=0). In an ideal case, it is infinite, but due to energy losses in real inductors and capacitors, it is a finite value. For example, a real parallel LC circuit (e.g., the electronic circuit illustrated in FIG. 7) will have some loss (such as losses in the dielectric of the capacitor and losses in the series resistance of the inductor, and may be losses that occur as the magnetic field of the inductor couples into other lossy materials) which can be modeled as a resistance in parallel with an ideal (i.e., lossless) LC circuit. At resonance, the reactance of the L and C cancel one another, leaving only the parallel resistance, Rp. The loss mechanisms are still in play at resonance, (still modeled as Rp) because current is still flowing in the reactive components, where the losses originate.

A high Rp is desirable because, as with Ohmic losses in DC circuits, a high Rp will produce a higher voltage across the circuit for a given current through the circuit. The Rp is also related to the Q of the circuit. A high Q is desirable because it implies high Rp and also because the resonance is more "peaky" and thus easier to identify. For example, inductive sensing processor 101 may more accurately determine the resonant frequency, because with a high Q, the top of the peak showing the resonant frequency is higher than a relatively flat peak.

As described above, inductive sensor 182 is located within fall protection device 11A (e.g., within a bowl of fall protection device 11A). In some cases, the metal material (e.g., carbon steel or aluminum) of fall protection device 11A may affect the inductance of inductive sensor 182 similar to how the support structure affects the inductance (e.g., by producing eddy currents). Accordingly, it is possible for the metal material of fall protection device 11A to cause a shift in the resonant frequency, and cause processors 100 to determine that a support structure is within the area of attachment. For example, without the shielding material, the resonant frequency (assuming 4.5 MHz baseline resonant frequency) may shift by 110 kHz due to the metal within fall protection device 11A.

In some examples, fall protection device 11A includes shielding material, such as ferrite material, but other material may be used, that is placed to surround (e.g., flank) inductive sensor 182 and electrically decouple inductive sensor 182 from the metal within fall protection device 11A. For example, the shielding material blocks the magnetic field generated by current flowing through inductive sensor 182 from inducing eddy currents in the metal of fall protection device 11A.

The thickness of the shielding material may affect the amount by which the resonant frequency shifts (e.g., changes) because the thickness of the shielding material determines the magnetic reluctance of the magnetic shield, and the reluctance of the magnetic shield also, and the permeability of the shielding material also affects the inductance of inductive sensor 182. The thinner the shielding material, the less volume of permeable material there is to affect the inductance of inductive sensor 182. Accordingly, the shielding material should be a thin as is practical for design needs.

For ferrite thickness of 0.2 mm, the change in the resonant frequency from the baseline frequency may be approximately 40 kHz, and for ferrite thickness of 0.05 mm, the change in resonant frequency from the baseline resonant frequency may be approximately 6 kHz. Examples of the shielding material include 3M Flux Field Directional Material (FDM) number EM15TF-007 or Larid MULL6060-300, both have a thickness of 0.05 mm and exhibit good results. Moreover, having shielding material may be beneficial because the resonant frequency of the electronic circuit of inductive sensor 182 may not shift or the shift may be greatly reduced when fall protection device is flexed or laterally compressed. It should be understood that inclusion of the example shielding material is provided for as one example and should not be considered as a requirement for all examples.

In some examples, fall protection device 11A includes a plurality of inductive sensors, similar to inductive sensor 182. For example, it is possible that a support structure may be within the area of attachment of fall protection device 11A but the resonant frequency of inductive sensor 182 does not change because the support structure is not sufficiently proximate to inductive sensor 182. By including multiple inductive sensors, similar to inductive sensor 182, in fall protection device 11A, the overall sensitivity of sensing that a support structure is within the area of attachment increases. In examples where there are a plurality of inductive sensors, the inductive sensing processor may sequentially determine the resonant frequency of each of the inductive sensors to prevent interactions, such as magnetic field interactions, between the inductive sensors.

Figure 8:
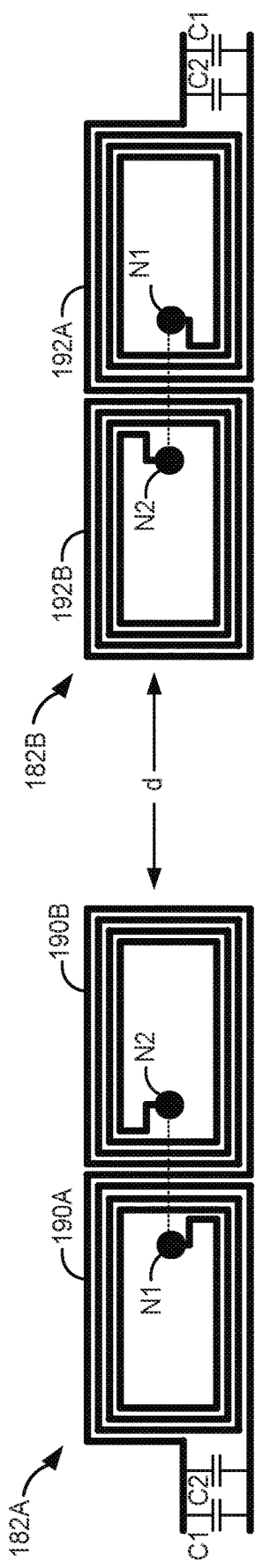
FIG. 8 is a conceptual diagram illustrating an example of a plurality of inductive sensors of a fall protection device.

FIG. 8 is a conceptual diagram illustrating an example of a plurality of inductive sensors of a fall protection device. As illustrated in FIG. 8, fall protection device 11A includes inductive sensors 182A and 182B, which are substantially similar, including identical, to inductive sensor 182. For example, inductive sensor 182A includes coils 190A and 190B, which are substantially similar, including identical, to coils 184A and 184B Similarly, inductive sensor 182B includes coils 192A and 192B, which are substantially similar, including identical, to coils 184A and 184B. Fall protection device 11A may include more than two inductive sensors.

By having a plurality of inductive sensors, the resonant frequency of one or more of the inductive sensors may shift based on the location of the support structure within the area of attachment. For example, if the support structure is proximate to inductive sensor 182A, then the resonant frequency of the electronic circuit of inductive sensor 182A may shift more than the resonant frequency of the electronic circuit of inductive sensor 182B, and vice-versa. As described above, with respect to FIGS. 4A and 4B, processors 100 may determine the amount by which the resonant frequency of both inductive sensors 182A and 182B shifted, sum the amounts together, and determine whether the support structure is within the area of attachment based on the summed value. As described above, with respect to FIG. 15, processors may determine a rate of change in the resonant frequency of inductive sensors 182A and 182B, and determine whether the support structure is within the area of attachment based on the rate of change in the resonant frequencies.

As illustrated in FIG. 8, inductive sensor 182A and inductive sensor 182B are separated by a distance "d." As one example, the distance d is approximately less than 10 mm, such as 3 mm. However, because there is a separation between inductive sensors 182A and 182B, the overall sensitivity of determining whether a support structure is within the area of attachment may be reduced. For example, if the support structure is located predominantly between inductive sensors 182A and 182B, the resonant frequencies of the electronic circuits of inductive sensors 182A and 182B may not change sufficiently, which may cause processors 100 to determine that the support structure is not within the area of attachment. To eliminate the gap, adjacent inductive sensors may overlap one another, as illustrated in FIG. 9.

Figure 9:
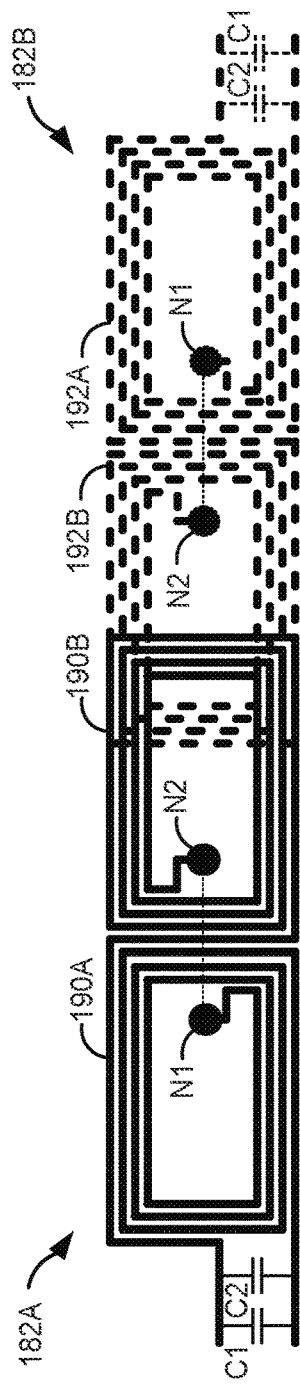
FIG. 9 is a conceptual diagram illustrating another example of a plurality of inductive sensors of a fall protection device.

FIG. 9 is a conceptual diagram illustrating another example of a plurality of inductive sensors of a fall protection device. As illustrated in FIG. 9, inductive sensor 182A partially overlaps inductive sensor 182B, shown with dashed lines. For example, inductive sensor 182A may be formed on a first higher layer of PCB 188, and inductive sensor 182B may be formed on a second lower layer of PCB 188 (e.g., other side of PCB 188 relative to where inductive sensor 182A is located), and partially beneath inductive sensor 182A. In some examples, PCB 188 may include four layers, where coils 190A and 190B are on different layers, and 192A and 192B are on different layers, and inductive sensors 182A and 182B are on different layers.

However, there may be a possibility that inductive sensors 182A and 182B magnetically couple with one another in the example of FIG. 9. To prevent such coupling, the amount of overlap may be selected to minimize the coupling. For example, magnetic coupling from inductive sensor 182A to inductive sensor 182B may have a coefficient between +1 and −1 based on geometric configuration. The coefficient is indicative of the amount of coupling between sensors 182A and 182B. In some examples, the geometric configuration is selected such that the magnetic coupling coefficient is approximately zero to minimize the magnetic coupling. One way to select the geometric configuration such that the magnetic coupling coefficient is zero is by trial-and-error (e.g., by testing two example PCBs 188, exciting one, and measuring magnetic coupling on the other). For example, multiple PCBs 188 may be formed with inductive sensors 182A and 182B having different amounts of overlap. The PCB that results in the smallest magnetic coupling coefficient may be selected as the PCB 188 that is placed within fall protection device 11A for determining whether a support structure is within the area of attachment.

FIGS. 7-9 illustrate examples of inductive sensors 182. In some examples, in addition to inductive sensors 182, fall protection devices 11 may include addition coils. For example, fall protection devices 11 includes a plurality of inductive sensors 182 on a flexible PCB. In addition, fall protection devices 11 may include additional sets of one or more coils. One example of such an additional coil is a magnet wire wound on a curved ferrite core, with the curve following the curve of the inductive sensors 182. The axis of the coil is approximately normal to the axis of inductive sensors 182. The use of such additional coils may be useful for detection of looped support structures such as D-rings.

Figure 10:
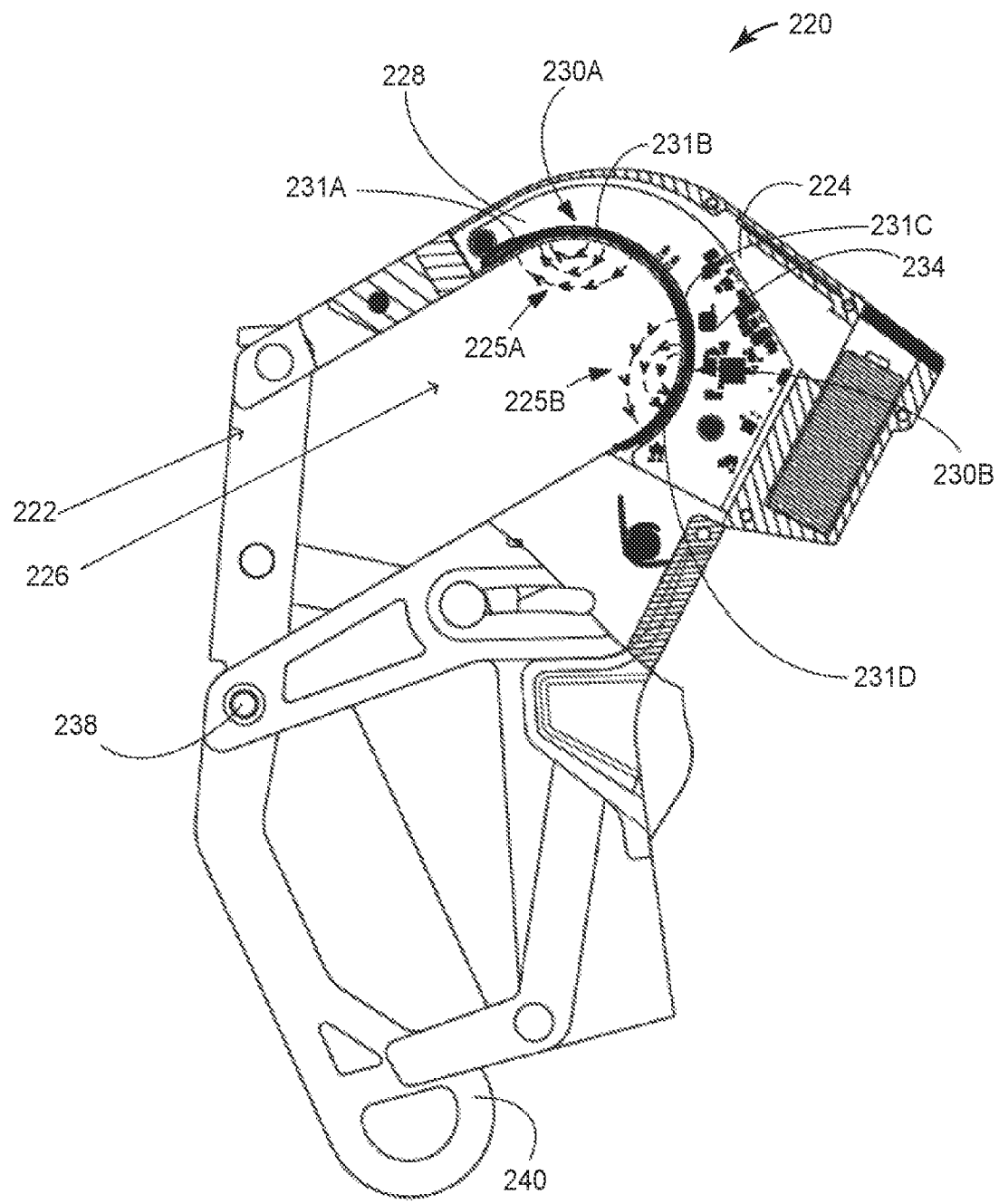
FIG. 10 illustrates an example of a carabiner that is configured in accordance with aspects of this disclosure.

FIG. 10 illustrates an example of a snap hook 220 that is configured in accordance with aspects of this disclosure. While the example illustrated in FIG. 10 comprises a snap hook, it should be understood that the techniques described herein may be applied to a variety of other devices for securing a user to an anchor, such as a carabiner. For example, a carabiner may be constructed similarly to snap hook 220, but may rely on a rotating or self-locking gate mechanism instead of the planar lock mechanism shown in FIG. 10.

The example snap hook 220 of FIG. 10 includes a moveable gate 222 and a body 224 that generally defines an area of attachment 226 within which a support structure is disposed when snap hook 220 is connected to the support structure. Snap hook 220 includes bowl 228, which includes the portion of snap hook 220 that curves around and is openable to receive the support structure within area of attachment 226. Snap hook 220 also includes sensors 230A and 230B (collectively sensors 230), which are illustrated as being located within bowl 228, computing device 234, and lock 238. Snap hook 220 may be attached to, for example, an energy absorbing lanyard, a self-retracting lanyard, or another device via attachment point 240.

Moveable gate 222 moves between an open position and a closed position. The example of FIG. 10 illustrates moveable gate 222 in the closed position such that moveable gate 222 contacts body 224 and creates a continuous loop that defines area of attachment 226. In the open position, moveable gate 222 pivots inward toward area of attachment 226 and allows a support structure to be moved into area of attachment 226.

One or more sensors 230, which may be examples of inductive sensors 182 of FIGS. 7-9, may be configured to sense whether a material (such as a support structure) is disposed within area of attachment 226. In the illustrated example, a resonant frequency of sensors 230 changes when a metal structure is within an electromagnetic field created by sensors 182 within area of attachment 226. As described herein, inductive sensor 230 may be positioned and oriented, e.g., as shown in the example of FIG. 10, to cause the electromagnetic field to be generated within the area of attachment 226. Examples of one or more sensors 230 are illustrated in FIGS. 7-9.

As illustrated, sensor 230A includes set of coils 231A and set of coils 231B. Sensor 230B includes set of coils 231C and set of coils 231B. Coils 231A and 231C may be similar to coils 184A, and set of coils 231B and 231D may be similar to coils 184B. When current flows through the electronic circuits of sensors 230A and 230B, the electronic circuits may generate electromagnetic fields within area of attachment 226 as illustrated with dashed lines 225A and 225B. The arrows in the dashed lines are shown to illustrate direction, and should not be considered limiting. The electromagnetic field (also called "flux") extends from coils 231B to coils 231A, and similarly from coils 231C to 231D. FIG. 10 illustrates a portion of the complete field, and the field is large enough to encompass area of attachment 226.

In some examples, the electromagnetic fields may alternate between sensors 230A and 230B. For example, sensor 230A may generate the electromagnetic field, and then sensor 230B may generate the electromagnetic field. Accordingly, in some examples, the both lines 225A and 225B need not necessarily be present at the same time, and may alternate.

In some examples, in addition to inductive sensors 230, snap hook 220 may include an additional coil such as a magnet wire wound on a curved ferrite core. The curve of the wound coil may be the same through bowl 228 (e.g., with the curve following the curve of the sensors 230). The axis of the coil is approximately normal to the axis of inductive sensors 182. The use of such additional coils may be useful for detection of looped support structures such as D-rings.

Although not shown, snap hook 220 includes one or more gate movement sensors that may be configured to generate data that indicates movement of gate 222. For example, the gate movement sensors may be configured to generate a signal that indicates that gate 222 has been moved from the closed position to the open position or vice versa. In some examples, the gate movement sensors may output a discrete signal (e.g., a signal that indicates whether gate 222 is in the open position or closed position). In other examples, the gate movement sensors may output data indicative of a relative position of gate 222. The gate movement sensors may include any sensor capable of generating an output based on a position or movement of gate 222, such as one or more switches, rotary encoders, accelerometers, or the like.

Computing device 234 may include computing components responsible for processing and/or transmitting data generated by one or more sensors 230 and the gate movement sensors. Computing device 234 may also include a power source, such as a battery. In some examples, computing device 234 may be configured to include the components of computing device 98 shown in FIG. 3. In other examples, computing device 234 may include a subset of computing device 98. For example, computing device 234 may simply include one or more processors and a communication unit for transmitting data from one or more sensors 230 and the gate movement sensors to another computing device.

Although not shown, snap hook 220 may include a primary locking mechanism that is configured to prevent gate 222 from being moved to the open position. For example, the primary locking mechanism includes a component that engages with gate 222 to prevent gate 222 from pivoting toward area of attachment 226. When a user operates the primary locking mechanism, the component of the primary locking mechanism disengages from gate 222 to allow gate to be moved toward area of attachment 226.

In some examples, lock 238 may be configured to impede or prevent gate 222 from being moved from a closed position to an open position based on a connection status of snap hook 220, thereby impeding or preventing snap hook 220 from being disconnected from a support structure. For example, computing device 234 (and/or another computing device in communication with snap hook 220) may determine whether snap hook 220 is connected to a support structure based on electrical characteristics of one or more sensors 230. That is, computing device 234 may receive data (e.g., from the inductive sensing processor) indicating resonant frequencies of one or more sensors 230 from which computing device 234 may determine whether a support structure is present within area of attachment 226. For instance, computing device 234 performs the example operations described above with respect to FIGS. 4A and 4B and/or FIG. 15 to determine whether a support structure is within area of attachment 226. Computing device 234 may determine a connection status based on such data. For example, computing device 234 may determine that snap hook 220 is connected when the support structure is present and gate 222 is closed.

Computing device 234 may also or alternatively use data from the gate movement sensors to determine the connection status. For example, computing device 234 may determine that snap hook 220 has been connected to a support structure based on a number of ordered operations. In this example, computing device 234 may receive data from the gate movement sensors that indicates that gate 222 has moved to an open position. Computing device 234 may receive data from one or more sensors 230 indicating that a support structure is disposed within area of attachment 226. Computing device 234 may then receive data from the gate movement sensors that indicates that gate 222 has moved to a closed position and determine that snap hook 220 has been connected to the support structure.

In one example, computing device 234 periodically activates one or more sensors 230 to determine whether a metal structure is disposed within area of attachment 226. In one example, computing device 234 may operate one or more sensors 230 based on data from the gate movement sensors. For example, upon receiving data from the gate movement sensors that gate 222 has moved to an open position, computing device 234 may determine the resonant frequencies of one or more sensors 230 in order to determine whether a metal support structure is within area of attachment 226.

After determining that snap hook 220 has been connected to a support structure, computing device 234 (or another computing device in communication with snap hook 220) may monitor the status of one or more other articles of fall protection equipment being used by the same user (referred to herein as a set of fall protection equipment). For example, computing device 234 may identify when the other articles of fall protection equipment are connected to and disconnected from one or more support structure, e.g., as a worker moves throughout a worksite. Computing device 234 may determine when snap hook 220 is the only article of fall protection equipment in the set that is connected to the support structure. Based on this determination, computing device 234 may activate lock 238 in order to impede or prevent gate 222 from being moved from a closed position to an open position based on a connection status of snap hook 220, thereby impeding or preventing snap hook 220 from being disconnected from a support structure.

In some examples, lock 238 may include a locking component that interfaces directly with gate 222 in order to prevent gate 222 from being opened. For example, lock 238 may include a mechanical barrier that prevents gate 222 from moving. In other examples, lock 238 may be configured to interface with one or more other locking mechanisms of snap hook 220, such as the primary locking mechanism. For example, lock 238 may include a mechanical barrier that prevents (e.g., restricts) the primary locking mechanism from moving, thereby preventing gate 222 from moving.

While the example described with respect to FIG. 10 includes the primary locking mechanism and lock 238, other examples may include additional locking mechanisms. For example, certain safety standards or codes may require at least two separate and deliberate actions for gate 222 to open, thereby allowing snap hook 220 to connect to or disconnect from a support structure. Each separate and deliberate action may be associated with a locking mechanism Example locking mechanisms for snap hook 220 may include latches, spring loaded collars, levers, or any combination of other components that require a deliberate action on the part of the user to operate. According to aspects of this disclosure, lock 238 may be a tertiary locking mechanism that is included in addition to the locking mechanisms associated with the two separate and deliberate actions.

Computing device 234 may also release lock 238. For example, computing device 234 may continue to monitor whether fall protection devices in the set is connected to the support structure. In the event that one or more other articles of fall protection devices are connected to the support structure, computing device 234 may release lock 238 such that lock 238 no longer impedes snap hook 220 from being disconnected from the support structure. Additionally or alternatively, lock 238 may include a manual override that allows a user to manually release lock 238.

In the event that computing device 234 actuates lock 238, computing device 234 may generate a signal that indicates lock 238 has been actuated and/or that lock 238 has been manually overridden. In some examples, computing device 234 may generate an electronic message, an audible output, a visual output, and/or tactile output that indicates that lock 238 has been activated and/or a manual override has been performed.

It should be understood that the architecture and arrangement of snap hook 220 illustrated in FIG. 10 is shown for exemplary purposes only. In other examples, snap hook 220 may be configured in a variety of other ways having additional, fewer, or alternative components than those shown in FIG. 10. For example, as noted above, snap hook 220 may be configured to include only a subset of components, such as one or more sensors 230, the gate movement sensors, and a communication unit for transmitting data to another computing device, such as one of hubs 14, for performing certain processing functions.

In another example, snap hook 220 may include a feedback component for indicating a connection status of snap hook 220. For example, the feedback component may comprise any variety of speakers, displays, lights, haptic feedback components, or the like to generate an audible alert, a visual alert, or a tactile alert in response to determining that the gate of snap hook 220 is opened when snap hook 220 is the only article of fall protection connected to a support structure. In the case where a worker is using two snap hooks (e.g., two of snap hooks 220) for fall protection, a computing device may determine that a first snap hook is connected to a support structure and its gate is closed, while a second snap hook is not connected to a support structure. If the computing device determines that the gate of the first snap hook is opened while the second snap hook is not connected to the support structure, then the computing device may cause the feedback component to indicate a connection status, provide an alert, or output any other output that may be discernable by the worker. Further examples are described in FIG. 14 and throughout this specification.

In some examples, snap hook 220 may be in a safe operation; however, snap hook 220 may lose detection of the support structure to which it is attached although the gate of snap hook 220 may not have opened. The loss of detection of snap hook 220 may occur due to physical properties or other physical material on the support structure and/or snap hook 220 that impairs the detection of the support structure by snap hook 220, or due to subsequent movement of the hook such that the support structure may have moved away from the detection area of the sensor. For instance, the property or physical material may be rust, insulators, or other material that impairs detection of the support structure by snap hook 220. If detection of the support structure by snap hook 220 is impaired or completely undetected but snap hook 220 is in a safe state and the gate of snap hook 220 has not been opened, then one or more processors associated with snap hook 220 may determine that snap hook 220 is still in safe operation although the support structure is not detected. In this way, even if the support structure is not detected for snap hook 220 but snap hook 220 is in safe operation because the gate of snap hook 220 was not opened since entering safe operation, the one or more processors associated with smart hook 220 will not determine snap hook 220 is an unsafe operation.

In some examples, one or more processors associated with snap hook 220 that determine the state of snap hook 220 may determine a state transition condition has occurred for a pre-defined time duration before transitioning from one state to another state. For instance, a state transition condition (e.g., "Anchor && Gate Open") may be required by the one or more processors to be true, exist, or otherwise be detected for the pre-defined time duration before the one or more processors determine that snap hook 220 has transitioned to the next state transition for the state transition condition.

In other examples, the one or more processors associated with snap hook 220 may, upon detecting a state transition condition, ignore other detected state transition conditions that occur within a pre-defined time duration after the state transition condition is detected. This technique may ensure the system transitions to a next state after detection of the state transition condition rather than remaining in the current state by ignoring any state change transitions that are detected during the pre-defined time duration and which would otherwise cause the system to remain in the current state.

In some examples, multiple snap hooks may be used together in a system. For instance, snap hook 220 may be used in a system as a first snap hook together with a second snap hook. In some examples, each of the first and second snap hooks may be included as part of an article of personal protection equipment. The personal protection equipment may be worn by a single worker and the worker may, in some examples, operate the first snap hook with the worker's first hand and the worker may operate the second snap hook with the worker's other, second hand. Each of the first and second snap hooks may be communicatively coupled to one or more processors that receive first and second data respectively from the first and second smart hooks. The one or more processors may be included a part of an article of personal protection equipment, a mobile computing device associated with the worker, or a remote computing device that is separate from the worker, personal protection equipment, and/or smart hooks. As described herein, the one or more processors may perform one or more operations based at least in part on the first data and the second data, such as but not limited to, generating alerts, processing the data, or sending the data to other computing devices.

In some examples, the first snap hook may be a first fall protection device comprising an inductive sensor having an electronic circuit and the second snap hook may be a second fall protection device comprising an inductive sensor having an electronic circuit. One or more processors in communication with the first fall protection device and the second fall protection device may determine that the first fall protection device is in an unsafe operation and the second fall protection device is in a safe operation. The one or more processors may determine that a gate of the second fall protection device is opened. The one or more processors may determine, based at least in part on the determination that the gate of the second fall protection device is opened, that the second fall protection device is in a sub-optimal operation. The one or more processors may generate, in response to the determination that the second fall protection device is in the sub-optimal operation, information indicating sub-optimal operation of the second fall protection device, wherein the information comprises at least one of audible, visual, or haptic information.

In some examples, the one or more processors may determine that the first fall protection device is in an unsafe operation and the second fall protection device is in a safe operation. The one or more processors may determine that the support structure is not within an area of attachment of the second fall protection device. The one or more processors may determine, based at least in part on the determination that the support structure is not within an area of attachment of the second fall protection device, that the second fall protection device is in an unsafe operation. In some examples, the one or more processors may generate, in response to the determination that the second fall protection device is in the unsafe operation, information indicating unsafe operation of the second fall protection device, wherein the information comprises at least one of audible, visual, or haptic information.

In still another example, snap hook 220 may include one or more components for determining whether a fall has occurred, such as a fall sensor not shown. For example, the fall sensor may comprise a switch, sensor, or the like for determining a fall condition. In one example, the fall sensor may determine deflection, movement, or motion of attachment point 240 to which a line constituent is attached in response to a load. If the load exceeds a predetermined threshold, the fall sensor (which may include hall-effect sensors, mechanical switches, or the like) may determine relative movement or a change in shape of attachment point 240.

In addition to generating a signal in the event that attachment point 240 (or another component located near the lower portion of snap hook 220) moves a predetermined amount in response to a given load, the position can also be monitored via sensors for a duration of time to indicate that a specific load has not only been applied to the connector but also applied for a duration. Based on such data, snap hook 220 (or computing device 98) may determine that a user has fallen (thereby generating the load), but is also suspended post fall.

Based on data from the fall sensor, snap hook 220 (or another device, such as computing device 98) may generate one or more alerts. For example, upon determining that a fall has occurred, the fall sensor may generate an audible, visual, or wireless communication (e.g., electronic message) that indicates that the fall has occurred.

Figure 11:
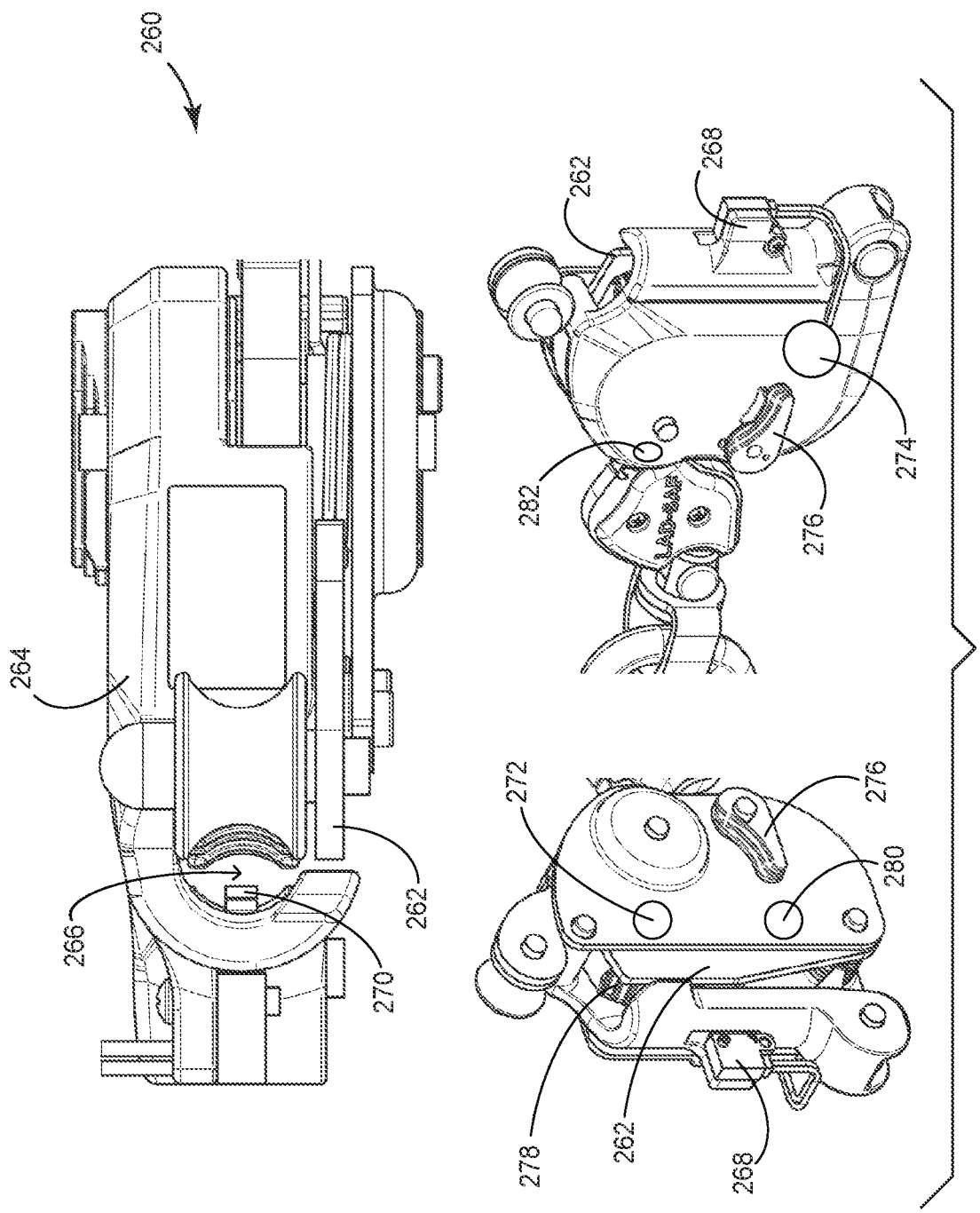
FIG. 11 illustrates an example of a carrier sleeve that is configured in accordance with aspects of this disclosure.

FIG. 11 illustrates an example of a carrier sleeve 260 that is configured in accordance with aspects of this disclosure. The example carrier sleeve 260 of FIG. 11 includes a moveable gate 262 and a gate 264 that generally defines an area of attachment 266 within which a support structure is disposed when carrier sleeve 260 is connected to the support structure, e.g., a vertically disposed cable that runs through area of attachment 266. Carrier sleeve 260 also includes inductive sensor housing 268 having one or more inductive sensors 270, sensor 272, computing device 274, primary locking mechanism 276, secondary locking mechanism 278 and lock 280.

Moveable gate 262 moves between an open position and a closed position. The example of FIG. 11 illustrates moveable gate 262 in the closed position such that moveable gate 262 is positioned proximate to gate 264 such that area of attachment 266 is a closed space that prevents a carrier from moving into or out of area of attachment 266. In the open position, moveable gate 262 pivots toward gate 264 and allows a support structure to be moved into area of attachment 266.

A resonant frequency of one or more sensors 270 may change when metal is disposed within area of attachment 266. For example, even without contact with one or more sensors 270, metal being disposed within area of attachment 266 may cause the resonant frequency of one or more sensors 270 to change, indicating that a suitable support structure is within the area of attachment 266. One or more sensors 270 may be similar to sensors 182 illustrated in FIGS. 7-9.

Sensor 272 may be configured to generate data that indicates movement of gate 262. For example, sensor 272 may be configured to generate a signal that indicates that gate 262 has been moved from the closed position to the open position or vice versa. In some examples, sensor 272 may output a discrete signal (e.g., a signal that indicates whether gate 262 is in the open position or closed position). In other examples, sensor 272 may output data indicative of a relative position of gate 262. Sensor 272 may include any sensor capable of generating an output based on a position or movement of gate 262, such as one or more switches, rotary encoders, accelerometers, or the like.

Computing device 274 may include computing components responsible for processing and/or transmitting data generated by one or more sensors 270 and sensor 272.

Computing device 274 may also include a power source, such as a battery. In some examples, computing device 274 may be configured to include the components of computing device 98 shown in FIG. 3. In other examples, computing device 274 may include a subset of computing device 98. For example, computing device 274 may simply include one or more processors and a communication unit for transmitting data from one or more sensors 270 and sensor 272 to another computing device.

Primary locking mechanism 276 is configured to prevent gate 262 from being moved to the open position. For example, primary locking mechanism 276 includes a component that engages with gate 262 to prevent gate 262 from moving to the open position. When a user operates primary locking mechanism 276 (e.g., a user rotates or otherwise moves primary locking mechanism 276) the component of primary locking mechanism 276 disengages from gate 262.

Secondary locking mechanism 278 is also configured to prevent gate 262 from being moved to the open position. For example, secondary locking mechanism 278 includes a spring component that prevents gate 262 from moving to the open position without a deliberate action by a user of carrier sleeve 260. When a user operates secondary locking mechanism 278 (e.g., a user presses secondary locking mechanism 278 to bias the spring) gate 262 moves to provide access to area of attachment 266.

In some examples, lock 280 may be configured to impede or prevent gate 262 from being moved from a closed position to an open position based on a connection status of carrier sleeve 260, thereby impeding or preventing carrier sleeve 260 from being disconnected from a support structure. For example, computing device 274 (and/or another computing device in communication with carrier sleeve 260) may determine whether carrier sleeve 260 is connected to a support structure based on resonant frequencies of one or more sensors 270. That is, computing device 274 may perform the example operations described above with respect to FIGS. 4A and 4B and/or FIG. 15 with one or more sensors 270 to determine whether a support structure is present within area of attachment 266. Computing device 274 may determine a connection status based on such data. For example, computing device 274 may determine that carrier sleeve 260 is connected when the support structure is present and disconnected when the support structure is not present.

In some examples, computing device 274 may also or alternatively use data from sensor 272 to determine the connection status. For example, computing device 172 may determine that carrier sleeve 260 has been connected to a support structure based on a number of ordered operations. In this example, computing device 274 may receive data from sensor 272 that indicates that gate 262 has moved to an open position. Computing device 274 may the receive data from first sensor 168 indicating that a support structure is disposed within area of attachment 266. Computing device 274 may then receive data from sensor 272 that indicates that gate 262 has moved to a closed position and determine that carrier sleeve 260 has been connected to the support structure.

After determining that carrier sleeve 260 has been connected to a support structure, computing device 274 (or another computing device in communication with carrier sleeve 260) may monitor the status of one or more other articles of fall protection devices 11 being used by the same user (referred to herein as a set of fall protection equipment). For example, computing device 274 may identify when the other articles of fall protection devices 11 (such as one or more snap hooks 220 (FIG. 10)) are connected to and disconnected from one or more support structure, e.g., as a worker moves throughout a worksite. Computing device 274 may determine when carrier sleeve 260 is the only article of fall protection equipment in the set that is connected to the support structure. Based on this determination, computing device 274 may activate lock 280 in order to impede or prevent gate 262 from being moved from a closed position to an open position based on a connection status of carrier sleeve 260, thereby impeding or preventing carrier sleeve 260 from being disconnected from a support structure.

In some examples, as described with respect to the example of FIG. 12 below, lock 280 may include a locking component that interfaces directly with gate 262 in order to prevent gate 262 from being opened. For example, lock 280 may include a mechanical barrier that prevents gate 262 from moving. In other examples, lock 280 may be configured to interface with one or more other locking mechanisms of carrier sleeve 260, such as primary locking mechanism 276 or secondary locking mechanism 278. For example, lock 280 may include a mechanical barrier that prevents primary locking mechanism 276 from being moved or rotated, thereby preventing gate 262 from moving.

In some examples, computing device 274 may also release lock 280. For example, computing device 274 may continue to monitor whether fall protection equipment in the set is connected to the support structure. In the event that one or more other articles of fall protection equipment are connected to the support structure, computing device 274 may release lock 280 such that lock 280 no longer impedes carrier sleeve 260 from being disconnected from the support structure. Additionally or alternatively, lock 280 may include a manual override that allows a user to manually release lock 280.

In the event that computing device 274 actuates lock 280, computing device 274 may generate a signal that indicates lock 280 has been actuated and/or that lock 280 has been manually overridden. In some examples, computing device 274 may generate an electronic message, an audible output, a visual output, and/or tactile output that indicates that lock 280 has been activated and/or a manual override has been performed.

It should be understood that the architecture and arrangement of carrier sleeve 260 illustrated in FIG. 11 is shown for exemplary purposes only. In other examples, carrier sleeve 260 may be configured in a variety of other ways having additional, fewer, or alternative components than those shown in FIG. 11. For example, as noted above, carrier sleeve 260 may be configured to include only a subset of components, such as one or more sensors 270, sensor 272, and a communication unit for transmitting data to another computing device, such as one of hubs 14, for performing certain processing functions.

In another example, carrier sleeve 260 may include a feedback component for indicating a connection status of carrier sleeve 260. For example, the feedback component may comprise any variety of speakers, displays, lights, haptic feedback components, or the like to generate an audible alert, a visual alert, or a tactile alert in response to determining that carrier sleeve 260 is the only article of fall protection connected to a support structure.

In still another example, carrier sleeve 260 may include one or more components for determining whether a fall has occurred, such as fall sensor 282. For example, according to aspects of this disclosure, fall sensor 282 may comprise a switch, sensor, or the like for determining a fall condition. In one example, fall sensor 282 may determine deflection, movement, or motion of a component that attaches carrier sleeve 260 to a user in response to a load. If the load exceeds a predetermined threshold, fall sensor 282 (which may include hall-effect sensors, mechanical switches, or the like) may determine relative movement or a change in shape of the attachment component. In other examples, fall sensor 282 may be positioned anywhere on carrier sleeve 260 that allows fall sensor 282 to determine a change in load to a component that attaches carrier sleeve 260 to a user.

In addition to generating a signal in the event that an attachment component moves a predetermined amount in response to a given load, the position can also be monitored via sensors for a duration of time to indicate that a specific load has not only been applied to the connector but also applied for a duration. Based on such data, carrier sleeve 260 (or computing device 98) may determine that a user has fallen (thereby generating the load), but is also suspended post fall.

Based on data from fall sensor 282, carrier sleeve 260 (or another device, such as computing device 98) may generate one or more alerts. For example, upon determining that a fall has occurred, fall sensor 282 may generate an audible, visual, or wireless communication (e.g., electronic message) that indicates that the fall has occurred.

Figure 12:
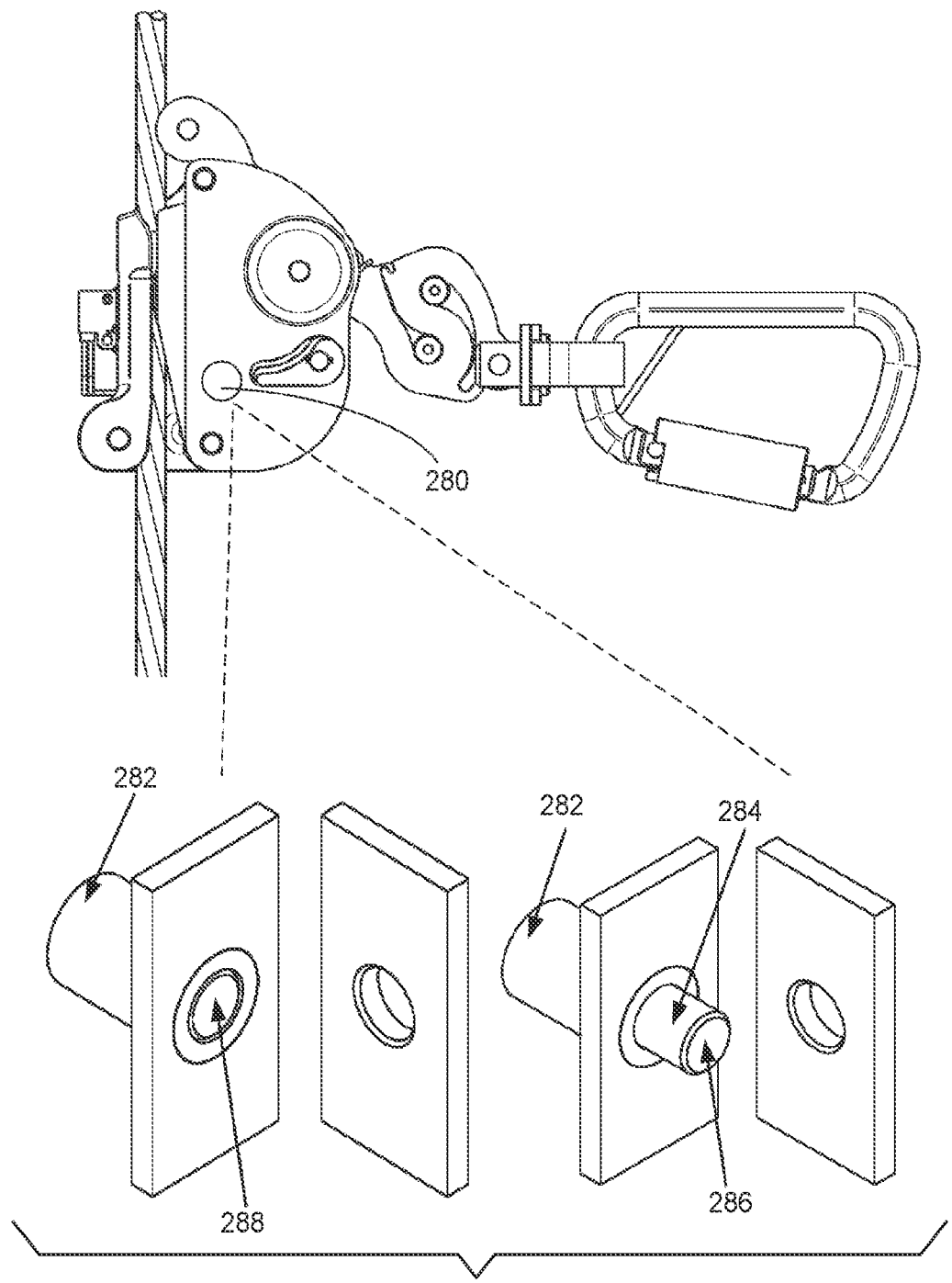
FIG. 12 illustrates another view of the ladder safety sleeve shown in FIG. 11.

FIG. 12 illustrates an example carrier sleeve 260 in greater detail. For example, as described above, lock 280 may be configured to impede or prevent gate 262 from being moved from a closed position to an open position based on a connection status of carrier sleeve 260, thereby impeding or preventing carrier sleeve 260 from being disconnected from a support structure. In the example of FIG. 12, lock 280 includes a solenoid 282 that moves a pin 284 from an extended position 286 to a retracted position 288 and vice versa.

For example, as described above with respect to FIG. 11, computing device 274 may determine when carrier sleeve 260 is the only article of fall protection equipment in the set that is connected to the support structure. Based on this determination, computing device 274 may activate lock 280. Upon activating lock 280, pin 284 may move from retracted position 288 to extended position 286. When in extended position 286, pin 284 may prevent gate 262 from moving from a closed position to an open position. In some examples, pin 284 may directly interface with gate 262 to prevent gate 262 from being opened. In other examples, pin 284 may interface with another component of carrier sleeve 260 (such as primary locking mechanism 276 or secondary locking mechanism 278) to prevent gate 262 from being opened.

In some examples, computing device 274 may also release lock 280. For example, computing device 274 may continue to monitor whether fall protection equipment in the set is connected to the support structure. In the event that one or more other articles of fall protection equipment are connected to the support structure, computing device 274 may release lock 280 by sending a signal to solenoid 282 to move pin 284 from extended position 286 to retracted position 288. Additionally or alternatively, lock 280 may include a manual override that allows a user to manually move pin 284 from extended position 286 to retracted position 288.

Figure 13:
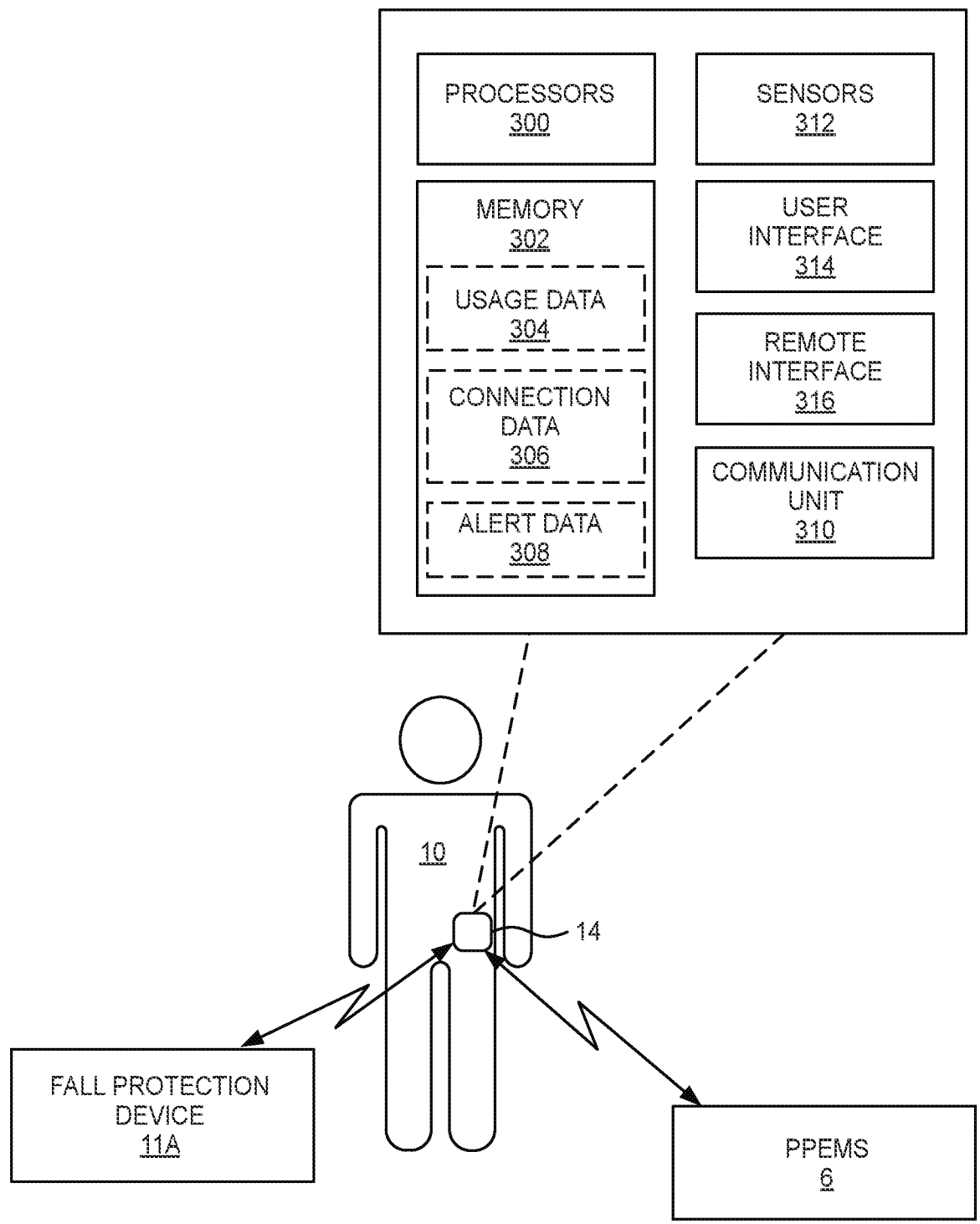
FIG. 13 is a conceptual diagram illustrating an example of fall protection equipment in communication with a wearable data hub, in accordance with various aspects of this disclosure.

FIG. 13 illustrates an example of one of hubs 14 in greater detail. For example, hub 14 includes one or more processors 300, memory 302 that may store usage data 304, connection data 306, and alert data 308, communication unit 310, sensors 312, user interface 314, and remote interface 316. It should be understood that the architecture and arrangement of hub 14 illustrated in FIG. 13 is shown for exemplary purposes only. In other examples, hub 14 may be configured in a variety of other ways having additional, fewer, or alternative components than those shown in FIG. 13. For example, hub 14 may also include one or more batteries, charging components, or the like not shown in FIG. 13. In addition, while shown as a wearable device in the example of FIG. 13, in other examples, hub 14 may be implemented as stand-alone device deployed in a particular environment.

In general, hub 14 may enable and facilitate communication between fall protection device 11A and PPEM 6. Examples of fall protection device 11A include snap hook 220 or carrier sleeve 260. For ease, FIG. 13 illustrates fall protection device 11A. Other example fall protection devices 11 may operate in a substantially similar manner.

Fall protection device 11A as well as other PPEs for a respective worker may communicate with hub 14 via Bluetooth or other short range protocol, and hub 14 may communicate with PPEMs 6 via wireless communications, such as via 802.11 WiFi protocols, or the like. In some examples, hub 14 may also control one or more components of fall protection device 11A (e.g., such as locks) based on connection data 306, generate and/or output alerts, or perform a variety of other functions.

Processors 300, in one example, are configured to implement functionality and/or process instructions for execution within hub 14. For example, processors 300 may be capable of processing instructions stored by memory 302. Processors 300 may include, for example, microprocessors, digital signal processors (DSPs), application specific integrated circuits (ASICs), field-programmable gate array (FPGAs), or equivalent discrete or integrated logic circuitry.

Memory 302 may include a computer-readable storage medium or computer-readable storage device. In some examples, memory 302 may include one or more of a short-term memory or a long-term memory. Memory 302 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 302 may store an operating system (not shown) or other application that controls the operation of components of hub 14. For example, the operating system may facilitate the communication of data from memory 302 to communication unit 310. In some examples, memory 302 is used to store program instructions for execution by processors 300. Memory 302 may also be configured to store information within hub 14 during operation. In the example shown in FIG. 13, memory 302 may store usage data 304, connection data 306, and/or alert data 308, as described in greater detail below.

Hub 14 may use communication unit 310 to communicate with external devices via one or more wired or wireless connections. Communication unit 310 may include various mixers, filters, amplifiers and other components designed for signal modulation, as well as one or more antennas and/or other components designed for transmitting and receiving data. Communication unit 310 may send and receive data to other computing devices using any one or more suitable data communication techniques. Examples of such communication techniques may include TCP/IP, Ethernet, Wi-Fi, Bluetooth, 4G, LTE, to name only a few examples. For example, communication unit 310 may communicate with fall protection device 11A or other PPE via Bluetooth or other short range protocol, and communication unit 310 may communicate with PPEMs 6 via wireless communications, such as via 802.11 WiFi protocols, or the like.

Sensors 312 may include one or more sensors that generate data indicative of an activity of a worker 10 associated with hub 14 and/or data indicative of an environment in which hub 14 is located. Sensors 312 may include, as examples, one or more accelerometers, one or more sensors to detect conditions present in a particular environment (e.g., sensors for measuring temperature, humidity, particulate content, noise levels, air quality, or any variety of other characteristics of environments in which fall protection device 11A may be used), or a variety of other sensors.

User interface 314 may include one more user interface devices including, as examples, a variety of lights, displays, haptic feedback generators, speakers or the like. In general, user interface 314 may output a status of fall protection device 11A and/or hub 14, as well as any alerts for worker 10. In one example, user interface 314 may include a plurality of multi-color LEDs that illuminate to provide information to worker 10. In another example, user interface 314 may include a motor that is configured to vibrate hub 14 to provide haptic feedback to worker 10.

Remote interface 316 is configured to generate data for output at clients 62 (FIG. 2). For example, remote interface 316 may generate data indicative of a status of fall protection device 11A and/or hub 14. For example, remote interface 316 may generate data that indicates whether fall protection device 11A is connected to hub 14 and/or information about components of fall protection device 11A. That is, remote interface 316 may generate data indicative of, as examples, remaining service life of fall protection device 11A, a status of a battery of fall protection device 11A, a connection status of fall protection device 11A, whether fall protection device 11A is the only fall protection equipment connected to a support structure, whether a user has performed a manual override of a lock of fall protection device 11A, whether maintenance or replacement of fall protection device 11A is needed, or the like. Remote interface 316 may additionally or alternatively generate data that is indicative of any alerts issued by hub 14.

According to aspects of this disclosure, hub 14 may store usage data 304 from sensors of fall protection device 11A. Usage data 304 generally refers to data that is indicative of the manner in which a user uses fall protection device 11A including, as examples, data that indicates a relative position of a component of fall protection device 11A, data that is indicative of whether a support structure is disposed within an area of attachment of fall protection device 11A, or other operations or characteristics of fall protection device 11A.

As described herein, electrical characteristics, such as resonant frequencies of sensors of fall protection device 11A may indicate operation of fall protection equipment 11 and an inductive sensing processor determines the resonant frequency and transmits data indicating the resonant frequency in real-time or near real-time to hub 14. In some examples, hub 14 may immediately relay usage data 304 to another computing device, such as PPEMS 6, via communication unit 310. In other examples, memory 302 may store usage data 304 for some time prior to uploading the data to another device. For example, in some instances, communication unit 310 may be able to communicate with fall protection device 11A but may not have network connectivity, e.g., due to an environment in which fall protection device 11A is located and/or network outages. In such instances, hub 14 may store usage data 304 to memory 302, which may allow the usage data to be uploaded to another device upon a network connection becoming available.

According to aspects of this disclosure, hub 14 also stores connection data 306 that indicates a connection status of fall protection device 11A used by worker 10. That is, connection data 306 may indicate whether fall protection device 11A in a set of fall protection devices being used by worker 10 are connected to a support structure. In some instances, hub 14 may receive connection data 306 from fall protection device 11A, e.g., as determined by fall protection device 11A. In other examples, hub 14 may receive data from sensors of fall protection device 11A and processors 300 may determine connection data 306 based on the received sensor data.

According to aspects of this disclosure, hub 14 may control the operation of fall protection device 11A based on connection data 306. For example, hub 14 may determine, based on connection data 306, that fall protection device 11A has been connected to a support structure. Hub 14 may also determine when one or more articles of fall protection device 11A have been disconnected from a support structure. Hub 14 may determine when a particular article of fall protection device 11A is the only article of fall protection device 11A in a set that is connected to a support structure. Based on this determination, in some examples, hub 14 may issue an audible, visual, or tactile alert (e.g., via user interface 314) or transmit an electronic message (e.g., via remote interface 316) that indicates that fall protection device 11A is the only article of fall protection equipment connected to the support structure. In other examples, hub 14 may activate a lock of fall protection equipment in order to impede or prevent fall protection equipment from being disconnected from the support structure.

Hub 14 may store alert data 308 for generating alerts for output by user interface 314 and/or remote interface 316. For example, hub 14 may receive alert data from PPEMS 6, fall protection device 11A, end-user computing devices 16, remote users using computing devices 18, safety stations 15, or other computing devices. In some examples, the alert data may be based on operation of fall protection device 11A. For example, hub 14 may receive alert data 308 that indicates that fall protection device 11A is the only article of fall protection equipment connected to the support structure. As another example, hub 14 may receive alert data 308 that indicates operation of a lock and/or that a lock has been manually overridden. As still another example, hub 14 may receive alert data 308 that indicates that a fall has occurred.

Hub 14 may interpret the received alert data 308 and generate an output at user interface 314 (e.g., an audible, visual, or tactile output) or remote interface 316 to notify worker 10 or a remote party of the alert condition (e.g., an operation or override of a lock, that the environment is dangerous, that fall protection device 11A is malfunctioning, that one or more components of fall protection equipment 11 need to be repaired or replaced, or the like). In some instances, hub 14 may also interpret alert data 308 and issue one or more commands to fall protection device 11A to modify operation or enforce rules of fall protection device 11A in order to bring operation of fall protection device 11A into compliance with desired/less risky behavior.

In general, while certain techniques or functions are described herein as being performed by certain components, e.g., PPEMS 6, fall protection devices 11, or hubs 14, it should be understood that the techniques of this disclosure are not limited in this way. That is, certain techniques described herein may be performed by one or more of the components of the described systems. For example, in some instances, fall protection devices 11 may have a relatively limited sensor set and/or processing power. In such instances, one of hubs 14 and/or PPEMS 6 may be responsible for most or all of the processing of usage data, determining connection status, and the like. In other examples, fall protection devices 11 may have additional sensors, additional processing power, and/or additional memory, allowing for fall protection devices 11 to perform additional techniques. Determinations regarding which components are responsible for performing techniques may be based, for example, on processing costs, financial costs, power consumption, or the like. The example techniques may be performed by one or more processors, which may be processors within fall protection devices 11, hubs 14, PPEMS 6, computing devices 16 and/or 18, and/or safety station 15.

Figure 14:
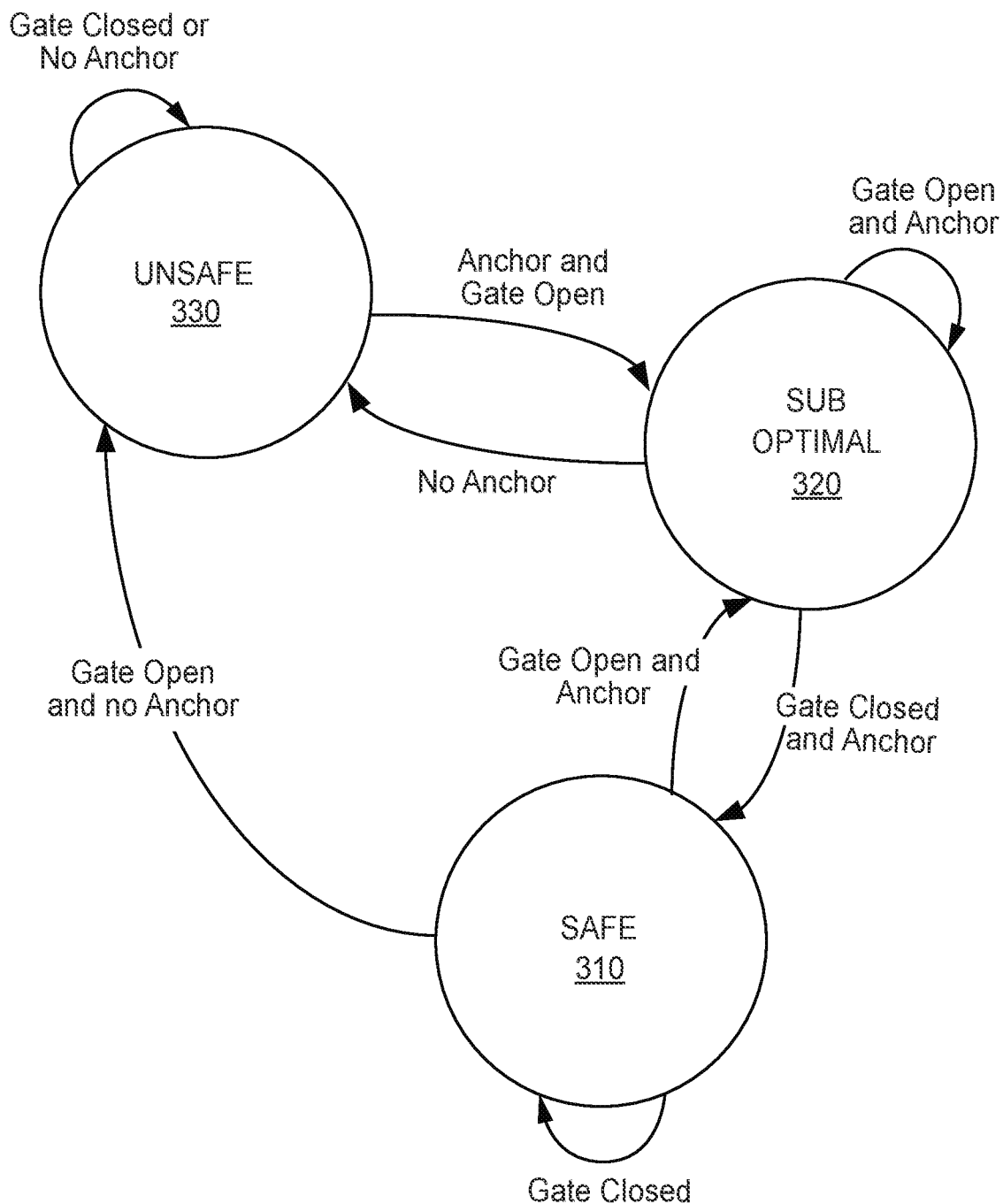
FIG. 14 illustrates a state machine indicating safety status of a fall protection device.

FIG. 14 illustrates a state machine indicating a safety status of a fall protection device. For ease, the example of FIG. 14 is described with the example snap hook 220 illustrated in FIG. 10, but the example is applicable to the other examples of fall protection devices 11. Also, the example state machine is described starting with safe condition 310. In safe condition 310, the gate movement sensors may be configured to generate data that indicates that gate 222 is in a closed position. Also, in safe condition 310, computing device 234 may have determined that a support structure is within area of attachment 226. For example, computing device 234 may have determined that the summed changes in the resonant frequencies of inductive sensors 230 increased by more than a threshold amount or the rate at which the summed changes in the resonant frequencies is greater than a threshold rate (e.g., as described above using the operations of FIGS. 4A and 4B and/or FIG. 15). Because computing device 234 determined that a support structure is disposed within area of attachment 226 and gate 222 is closed, then snap hook 220 should be anchored to a support structure, and therefore, in safe condition 310 (e.g., worker 10A is safely tied-off to a support structure). In response, computing device 234 may generate information indicating safe operation, and potentially output such information to hubs 14, safety stations 15, computing device 16, and/or PPEMS 6.

Examples of the information include an electronic message, an audible output, a visual output, and/or tactile output. In some examples, hubs 14 may be configured to generate and output information indicating the operation of snap hook 220. In FIG. 14, for the various operations, computing device 234 is described as generating information indicating operation of snap hook 220. However, hubs 14, safety stations 15, computing devices 16 or 18, and/or PPEMS 6 may generate and output such information.

Subsequent to generating information indicating safe operation, computing device 234 may determine that the support structure is not disposed within area of attachment 226, but without the gate 222 opening. For example, computing device 234 may perform the operations described in FIGS. 4A and 4B and/or FIG. 15 and determine that the support structure is no longer disposed within area of attached 226. However, computing device 234 may have also determined that gate 222 never opened. In this case, because it is very unlikely that the support structure is no longer present within area of attachment 226 without gate 222 opening, computing device 234 may repeat generating information indicating safe operation. As illustrated in FIG. 14, once in safe condition 310, regardless of whether computing device 234 determines that the support structure is still present or determines that the support structure is not present, computing device 234 determines that snap hook 220 is in a safe condition as long as gate 222 remained closed ("Gate Closed" of 310).

Subsequent to generating information indicating safe operation, computing device 234 may determine that gate 222 is opened and that the support structure is disposed within area of attachment 226 ("Gate Open && Anchor" of 310). For example, computing device 234 performs the operations of FIGS. 4A and 4B and/or FIG. 15 and determines that the support structure is still within area of attachment 226, but also determines that gate 222 is open. In this example, computing device 234 may determine that snap hook 220 is in a sub-optimal condition 320, and generate information indicating the sub-optimal operation of snap hook 220.

In sub-optimal condition 320, gate 222 is open, but the support structure is still within area of attachment 226. Computing device 234 may determine that snap hook 220 is in sub-optimal condition 320 as long as gate 222 is open and as long as the support structure is within area of attachment 226 ("Gate Open and Anchor" of 320). Accordingly, computing device 234 may repeat generating information indicating sub-optimal operation (e.g., snap hook 220 is in sub-optimal condition 320) as long as gate 222 is open and a support structure is within area of attachment 226 ("Anchor and Gate Open" of 320). If computing device 234 determines that gate 222 is closed and determines that the support structure is within area of attachment 226 ("Gate Closed and Anchor" of 320, then computing device 234 may determine that snap hook 220 is in safe condition 320, and generate information indicating safe operation of snap hook 220.

If, however, computing device 234 determines that gate 222 is open and there is no support structure within area of attachment 226 ("No Anchor" of 320), then computing device 234 may determine that snap hook 220 is in an unsafe condition 330. Computing device 234 may generate information indicating the unsafe operation of snap hook 220. In unsafe condition 330, gate 222 is open and there is no support structure within the area of attachment 226.

Once in unsafe condition 330, computing device 234 may determine that snap hook 220 is in unsafe condition 330 as long as computing device 234 determines that there is no support structure within area of attachment 226 ("No Anchor" of 330) or gate 222 is closed ("Gate Closed" of 330). Computing device 234 may therefore repeatedly generate information indicating unsafe operation until computing device 234 determines sub-optimal operation or safe operation.

For instance, if computing device 234 determines that there is a support structure within area of attachment 226, and determines that gate 222 is open ("Anchor && Gate Open" of 330), then computing device 234 may determine that snap hook 220 is in the sub-optimal condition 320. Computing device 234 may then generate information indicating the sub-optimal operation of snap hook 220. Also, as illustrated in FIG. 14, if computing device 234 determines that snap hook 220 is in safe condition 310, but subsequently determines that gate 222 is open and that there is no support structure within area of attachment 226 ("Gate Open && No Anchor" of 310), computing device 234 may determine that snap hook 220 is operating in the unsafe condition 330. Computing device 234 may then generate information indicating the unsafe operation of snap hook 220.

Although the above example techniques are described with respect to computing device 234, the example techniques may be performed together or in combination with various other processors such as those of hubs 14, safety stations 15, computing device 16, and/or PPEMS 6. Accordingly, the example techniques described above for FIG. 14 may be performed by one or more processors, examples of which include processors within fall protection devices 11, hubs 14, safety stations 15, computing device 16, and/or PPEMS 6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

This application is a continuation of U.S. patent application Ser. No. 16/968,281 (published as U.S. Patent Application Publication No. 2020/0368563, and now allowed), which was a national stage filing under 35 U.S.C. 371 of PCT Application No. PCT/US2019/016768 (published as International Publication No. WO2019/157007), which claimed priority to U.S. Provisional Application No. 62/628,720, the disclosures of all of which are incorporated by reference in their entirety herein.

Various examples have been described. These and other examples are within the scope of the following claims.

What is claimed is:

1. A fall protection device comprising:
a gated hook comprising:
a body that at least partially defines an area of attachment configured to receive a metal structure, and
a moveable gate connected to the body and configured to move between an open position and a closed position, wherein the open position provides access to the area of attachment of the gated hook and the closed position restricts access to the area of attachment of the gated hook;
at least one inductive sensor for sensing whether the metal structure is within the area of attachment of the gated hook, the at least one inductive sensor being configured so that a resonant frequency of an electrical circuit of the at least one inductive sensor changes when the metal structure is within the area of attachment relative to when the metal structure is not within the area of attachment;
at least one gate sensor configured to generate data indicating whether the moveable gate is in the open position or the closed position;
and,
one or more processors configured to:
determine a resonant frequency change in the electrical circuit of the at least one inductive sensor responsive to the metal structure being within the area of attachment and to determine that the metal structure is within the area of attachment based on the resonant frequency change;
receive the data from the at least one gate sensor indicating whether the moveable gate is in the open position or the closed position;
and,
generate information indicative of whether a user of the fall protection device is connected, by way of the fall protection device, to an anchorage capable of supporting the weight of the user in the event of a user fall, based at least in part on a determination of whether the metal structure is within the area of attachment of the gated hook and the moveable gate of the gated hook is in the closed position.

2. The fall protection device of claim 1, wherein the one or more one or more processors are configured to generate information indicative that the user of the fall protection device is connected to the anchorage capable of supporting the weight of the user in the event of a user fall, based at least on part on a determination that the metal structure is within the area of attachment of the gated hook and the moveable gate of the gated hook is in the closed position.

3. The fall protection device of claim 1, wherein the one or more one or more processors are configured to generate information indicative that the user of the fall protection device is not connected to the anchorage capable of supporting the weight of the user in the event of a user fall, based at least in part on a determination that the metal structure is not within the area of attachment of the gated hook and/or that the moveable gate of the gated hook is in the open position.

4. The fall protection device of claim 1, wherein the one or more processors are configured to generate information indicative that the user of the fall protection device is connected to the anchorage capable of supporting the weight of the user in the event of a user fall, based at least on part on a determination of the following operations:
the moveable gate of the gated hook was detected as having opened;
then,
the metal structure was detected within the area of attachment of the gated hook and
the moveable gate of the gated hook was detected as having closed.

5. The fall protection device of claim 1, wherein the one or more one or more processors are configured to continue to generate information indicative that the user of the fall protection device is connected to the anchorage even if the metal structure ceases to be detected in the attachment area of the gated hook, as long as: 1) it was previously determined that the user was connected to the anchorage, and 2) during a time since the determination that the user was connected to the anchorage, the moveable gate of the gated hook has continued to be detected as remaining in the closed position and/or has not been detected as having moved to the open position.

6. The fall protection device of claim 1, wherein the information indicative of whether the user of the fall protection device is connected to the anchorage capable of supporting the weight of the user in the event of a user fall, comprises at least one of audible information, visual information, and information that is wirelessly transmitted to a wireless access point.

7. The fall protection device of claim 1 wherein the fall protection device comprises a lanyard.

8. The fall protection device of claim 1 wherein the fall protection device comprises a self-retracting lanyard (SRL).

9. The fall protection device of claim 1 wherein the fall protection device comprises an energy-absorbing lanyard.

10. The fall protection device of claim 1 wherein the gated hook is mounted to an end of a lanyard of the fall protection device.

11. The fall protection device of claim 1 wherein the gated hook is chosen from the group consisting of a snap hook, a spring hook, a carabiner, and a shackle.

12. The fall protection device of claim 1 wherein the area of attachment of the gated hook is configured to receive a metal structure that is a D-ring.

13. The fall protection device of claim 1 wherein the fall protection device is configured so that the connecting of the user of the fall protection device to the anchorage capable of supporting the weight of the user in the event of a user fall includes connecting the gated hook of the fall protection device to a safety harness worn by the user of the fall protection device.

14. The fall protection device of claim 1 wherein the area of attachment of the gated hook is at least partially defined by a bowl of the body of the gated hook and wherein at least a portion of the electrical circuit of the at least one inductive sensor is disposed around at least a portion of the bowl of the body of the gated hook.

15. The fall protection device of claim 14 wherein at least a portion of the electrical circuit of the at least one inductive sensor is disposed on a flexible printed circuit board that is flexed around at least a portion of the bowl of the body of the gated hook.

16. The fall protection device of claim 1 wherein the one or more processors are further configured to determine whether a user fall has occurred based on whether the one or more processors receive information indicating that a load applied to the gated hook has exceeded a predetermined threshold.

17. The fall protection device of claim 1 wherein the one or more processors are further configured to determine whether a user fall has occurred based on whether the one or more processors receive information indicating that a component of the gated hook has undergone deflection and/or relative movement.

18. The fall protection device of claim 1 wherein the fall protection device comprises an accelerometer configured to generate data indicative of whether an acceleration of the fall protection device has occurred, with the one or more processors being configured to determine whether a user fall has occurred based on the data generated by the accelerometer.

19. The fall protection device of claim 1 wherein the fall protection device comprises an accelerometer configured to generate data indicative of activity of a user of the fall protection device.

20. The fall protection device of claim 1 wherein the open position of the moveable gate of the gated hook is a position in which a primary locking mechanism of the gate is disengaged.

21. The fall protection device of claim 1 wherein the primary locking mechanism of the gate comprises a spring loaded collar.

22. A fall protection apparatus comprising the fall protection device of claim 13 and further comprising the safety harness worn by the user of the fall protection device.

23. A fall protection system comprising the fall protection apparatus of claim 22 with the fall protection device of the fall protection apparatus being connected to the safety harness and to the anchorage, so that the fall protection apparatus and the anchorage constitute a fall protection system configured so that the user of the fall protection system is connected to the anchorage by way of the fall protection apparatus.

24. A method of operating the fall protection device of claim 1, the method comprising:
determining a change in the resonant frequency of the electrical circuit of the at least one inductive sensor of the fall protection device of claim 1;

determining whether the metal structure is within the area of attachment of the gated hook of the fall protection device based on the change in the resonant frequency of the electrical circuit of the at least one inductive sensor; and, generating information indicative of whether the user of the fall protection device is connected to the anchorage capable of supporting the weight of the user in the event of a user fall, based on the determination of whether the metal structure is within the area of attachment of the gated hook and the moveable gate of the gated hook is in the closed position.

* * * * *

UNITED STATES PATENT AND TRADEMARK OFFICE
CERTIFICATE OF CORRECTION

PATENT NO.         : 12,090,351 B2                                 Page 1 of 1
APPLICATION NO.    : 18/121651
DATED              : September 17, 2024
INVENTOR(S)        : Anthony J Nowicki et al.

It is certified that error appears in the above-identified patent and that said Letters Patent is hereby corrected as shown below:

In the Claims

<u>Column 55</u>

Lines 6-7, in Claim 2, delete "one or more one or more processors" and insert -- one or more processors --, therefor.

Line 11, in Claim 2, delete "on part on a determination" and insert -- in part on a determination --, therefor.

Line 28, in Claim 2, delete "at least on part" and insert -- at least in part --, therefor.

Lines 14-15, in Claim 3, delete "one or more one or more processors" and insert -- one or more processors --, therefor.

Lines 37-38, in Claim 3, delete "one or more one or more processors" and insert -- one or more processors --, therefor.

Signed and Sealed this
Eighteenth Day of February, 2025

Coke Morgan Stewart
*Acting Director of the United States Patent and Trademark Office*